US010253613B2

(12) United States Patent
Awadh et al.

(10) Patent No.: US 10,253,613 B2
(45) Date of Patent: *Apr. 9, 2019

(54) GUIDED DRILL SYSTEM FOR OIL RESERVOIR DRILLING

(71) Applicant: KING FAHD UNIVERSITY OF PETROLEUM AND MINERALS, Dhahran (SA)

(72) Inventors: Mohamed Hassan Awadh, Dammam (SA); Sami Abdulaziz Alnuaim, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/917,243

(22) Filed: Mar. 9, 2018

(65) Prior Publication Data
US 2018/0195376 A1    Jul. 12, 2018

Related U.S. Application Data

(63) Continuation of application No. 14/876,867, filed on Oct. 7, 2015, now Pat. No. 10,018,029.
(Continued)

(51) Int. Cl.
*G06F 19/00* (2018.01)
*E21B 44/00* (2006.01)
(Continued)

(52) U.S. Cl.
CPC .............. *E21B 44/005* (2013.01); *E21B 7/04* (2013.01); *E21B 43/162* (2013.01); *E21B 43/20* (2013.01);
(Continued)

(58) Field of Classification Search
CPC ..................................................... E21B 44/005
(Continued)

(56) References Cited

U.S. PATENT DOCUMENTS 7,441,612 B2 * 10/2008 Durairajan .............. E21B 10/42
175/426
8,776,914 B2    7/2014 Demichel et al.
(Continued)

OTHER PUBLICATIONS

S.D. Joshi, "Augmentation of Well Productivity With Slant and Horizontal Wells", Journal of Petroleum Technology, Jun. 1988, pp. 729-739.
(Continued)

*Primary Examiner* — Evral E Bodden
(74) *Attorney, Agent, or Firm* — Oblon, McClelland, Maier & Neustadt, L.L.P.

(57) ABSTRACT

A drill guidance device, a method to control a trajectory of a drill, and a non-transitory computer readable medium that determine the corrected drill angle and send an output signal to a drill controller configured to control an angle of a drill. The corrected drill angle is determined by at least one of a slant angle data and a formation property data received from a sensor device. The drill guidance device, the method to control a trajectory of a drill, and the non-transitory computer readable medium can be implemented in a measuring while drilling model to provide live guidance during a drilling operation or a predictive model to plan prior to the start of a drilling operation. The corrected drill angle is acted upon by a drill controller to maximize the productivity of an oil reservoir.

9 Claims, 18 Drawing Sheets

Related U.S. Application Data

(60) Provisional application No. 62/155,184, filed on Apr. 30, 2015.

(51) Int. Cl.
  *E21B 7/04* (2006.01)
  *E21B 47/024* (2006.01)
  *E21B 49/00* (2006.01)
  *G05B 19/402* (2006.01)
  *E21B 43/16* (2006.01)
  *E21B 43/20* (2006.01)

(52) U.S. Cl.
  CPC .......... *E21B 47/024* (2013.01); *E21B 49/003* (2013.01); *G05B 19/402* (2013.01); *G05B 2219/45129* (2013.01)

(58) Field of Classification Search
  USPC ........................................................ 700/186
  See application file for complete search history.

(56) References Cited

U.S. PATENT DOCUMENTS

| | | | | |
|---|---|---|---|---|
| 2010/0000791 | A1* | 1/2010 | Alberty | E21B 21/08 175/45 |
| 2012/0316787 | A1* | 12/2012 | Moran | E21B 44/00 702/9 |
| 2014/0136117 | A1 | 5/2014 | Banian et al. | |

OTHER PUBLICATIONS

Ming-Ming Chang, "Simulation of Production From Wells With Horizontal/Slanted Laterals" ITT Research Institute, National Institute for Petroleum and Energy Research, Mar. 1989, 47 pages.

\* cited by examiner

GUIDED DRILL SYSTEM FOR OIL RESERVOIR DRILLING

CROSS-REFERENCE TO RELATED APPLICATIONS

The present application is a Continuation of Ser. No. 14/876,867, having a filing date of Oct. 7, 2015 and claiming benefit of priority to provisional application 62/155,184 having a filing date of Apr. 30, 2015, the contents of which are incorporated herein by reference in their entirety.

BACKGROUND OF THE INVENTION

Technical Field

The present invention relates to a device, method and non-transitory computer readable media to guide a drill during well drilling, and to guide a drill during well drilling for water injection well used to improve the production of hydrocarbons from an oil reservoir.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The inflow performance relationship (IPR) represents a crucial factor in estimating and evaluating the reservoir behavior. It is of importance to production and reservoir engineers. The IPR is synonymous with a quantity called the productivity index (PI), or the injectivity index (II) for injection wells. It is a relationship between the reservoir flow/injection rate and the flowing/injection bottom-hole pressure (PWF/PWJ). For water supply and water injection wells, it is a function of many reservoir parameters like reservoir thickness, permeability, drainage radius, and skin as well as well geometry. For every reservoir with different rock and fluid properties and different types of wells, the PI is calculated according to distinct process using a particular equation. Most of the published work and methods were developed for vertical, single horizontal and multilateral wells. Slanted models are uncommon for hydrocarbon wells. The most widely used models for calculating PI for slanted wells express the well deviation effect into a pseudo-skin of a vertical well's IPR.

Reservoirs put on production will experience a decline in its pressure with time unless there is a strong pressure support from an aquifer or a gas cap. In absence of this natural support, artificial pressure maintenance is needed to boost and preserve the reservoir energy and to keep the pressure above the bubble point to prolong profitability of the reservoir. Water flooding is the most common and successful operation to achieve this goal. Generally, water flooding operations involve injecting huge amounts of water into the reservoir. This amount of water can be supplied form a nearby water formation or be treated sea water; so some wells are drilled into water-producing formation and are used as water supply for hydrocarbon production.

In oil fields, oil and water wells are drilled in many ways in order to reach a pay zone. These wells can be vertical, directional, horizontal or a combination of any of these geometries. Some conditions may dictate the path of the well like lithology, engineering aspects, economics, location etc. For example, in offshore rigs it is favorable to drill wells with an angle (slanted), highly deviated or horizontally to drain the reservoir. Near populated areas, wells are side-tracked from a distance to reach the reservoir. In some cases drilling a well may not go as planned and the well penetrates the reservoir with an angle from one or more bedding planes. Generally, slanted wells are those wells with an angle between 15° to 60°, whereas wells with an angle greater than 60° are considered highly-deviated. Slanted wells' most important advantage is to increase the contact area with the reservoir in order to achieve higher productivity/injectivity. Though, the cost of drilling slanted or horizontal well is much higher than drilling a well vertically.

For a vertical well producing from a single-oil reservoir, the productivity index (PI) can be given from Darcy's law as:

$$PI = \frac{q_o}{P_e - P_{wf}} = \frac{kh}{141.2 B_o \mu_o \left[\ln\left(\frac{r_e}{r_w}\right) + s\right]} \quad (1)$$

Where PI is Productivity Index (STB/Day/PSI), $q_o$ is Oil Production (STB/D), $P_e$ is Reservoir Pressure (PSI), $P_{wf}$ is Flowing Bottom Hole Pressure (PSI), k is permeability (MD), h is Reservoir Thickness (FT), $B_o$ is Oil formation Volume Factor (RB/STB), $\mu_o$ is Oil Viscosity (CP), $r_e$ is Drainage Radius (FT), $r_w$ is Wellbore Radius (FT), s is Skin Factor (Dimensionless).

$$II = \frac{q_w}{P_{wfi} - P_e} = \frac{kh}{141.2 B_w \mu_w \left[\ln\left(\frac{r_e}{r_w}\right) + s\right]} \quad (2)$$

For Water Injection, the injectivity index (II) can be determined as:
Where II is Injectivity Index (STB/Day/PSI), $q_w$ is Water Injection (STB/D), $P_e$ is Reservoir Pressure (PSI), $P_{wfi}$ is Bottom Hole Injection Pressure (PSI), $B_w$ is Water formation Volume Factor (RB/STB), and $\mu_w$ is Water Viscosity (CP).

The right-hand side of equations (1) and (2) is identical for a water supplier and a water injector, because in both cases the fluid is water. As for slanted and highly-deviated wells, Choi et al. (2008) disclosed that "no analytical correlations identified for slanted well geometry; instead, three correlations for deviation skin were applied to combine with any correlation made for the vertical well to calculate PI for slanted wells". See Choi, S. K., Ouyang, L. B. and Huang, W. S., "A Comprehensive Comparative Study on Analytical PI/IPR Correlations", SPE 116580 presented at the 2008 SPE Annual Technical Conference and Exhibition of the Society of Petroleum Engineering held in Denver, Colo., USA, 21-24 Sep. 2008, incorporated herein by reference in its entirety. Cinco et al. (1975) proposed a simple correlation for slanted skin based on the study of unsteady state flow of a slightly compressible fluid. See Cinco, H., Miller, F. G., and Ramey, H. J., "Unsteady-State Pressure Distribution Created By a Directionally Drilled Well", JPT, p 1392-1400, November, 1975, incorporated herein by reference in its entirety. This correlation is valid for well deviation angles between 0 to 75°:

$$s_\theta = -\left(\frac{\theta'_w}{41}\right)^{2.06} - \left(\frac{\theta'_w}{56}\right)^{1.865} \log_{10}\left(\frac{h_D}{100}\right) \text{ Where} \quad (3)$$

-continued $$\theta'_w = \tan^{-1}\left(\sqrt{\frac{k_v}{k_h}}\tan(\theta)\right), h_D = \frac{h}{r_w}\sqrt{\frac{k_h}{k_v}}$$

$k_v$ is the Vertical Permeability (MD), $k_h$ is Horizontal Permeability (MD), $\theta$ is the Deviation Angle (Degree), h is the Reservoir Thickness (FT).

Besson (1986) proposed another slanted well skin correlation from the results of a semi-analytical simulator. See Besson, J., "Performance of Slanted and Horizontal Wells on an Anisotropic Medium", SPE 20965, October 1986, incorporated herein by reference in its entirety. For isotropic reservoir and slant angles between 0° to 90°:

$$s_\theta = \ln\left(\frac{4r_w}{L}\right) + \frac{h}{L}\ln\left(\frac{\sqrt{Lh}}{4r_w}\right) \quad (4)$$

and for anisotropic reservoir:

$$s_\theta = \ln\left(\frac{4r_w1}{L\alpha\gamma}\right) + \frac{h}{\gamma L}\ln\left(\frac{\sqrt{Lh}}{4r_w1+1/\gamma}\frac{2\alpha\sqrt{\gamma}}{}\right) \text{ where} \quad (5)$$

$$\alpha = \sqrt{k_h/k_v}, \gamma = \sqrt{\frac{1}{\alpha^2} + \frac{h^2}{L^2}\left(1 - \frac{1}{\alpha^2}\right)}$$

and L is the well length.
Rogers and Economides (1996) presented an expression for the pseudo-skin as:

$$s_\theta = -1.64\frac{\sin\theta^{1.77}h_D^{0.184}}{I_{ani}^{0.821}} \text{ for } I_{ani} < 1 \quad (6)$$

$$s_\theta = -2.48\frac{\sin\theta^{5.87}h_D^{0.152}}{I_{ani}^{0.964}} \text{ for } I_{ani} > 1 \text{ Where} \quad (7)$$

$$I_{ani} = \sqrt{\frac{k_h}{k_v}}, k_h = \sqrt{k_x k_y}, h_D = \frac{h}{r_w}$$

See Roger, E., and Economides, M., "The Skin due to Slant of deviated Wells in Permeability-Anisotropic Reservoirs", SPE 37068, November 1996, incorporated herein by reference in its entirety. Slanted wells produce more fluid from the reservoir than vertical wells do because of the increased area open to flow. Similarly for the injection wells, they achieve higher injectivity and perform better in compared to vertical wells. Cinco, Besson and Economides expressed the effect of well slant into the form of pseudo-skin.

The present disclosure is concerned with the performance of wells that operate as slanted and highly-deviated water supply and water injection wells.

BRIEF SUMMARY OF THE INVENTION

According to a first aspect the present disclosure includes a drill guidance device comprising circuitry that is configured to determine a slant angle of a drill based on directional sensor data received from one or more sensor devices, determine one or more formation properties based on formation sensor data received from the one or more sensor devices, calculate a corrected drill angle based on the slant angle and the formation properties, and output the corrected drill angle to a drill controller configured to control an angle of trajectory of the drill.

In some implementations of the drill guidance device, the circuitry may be further configured to determine the slant angle based on the directional sensor data received from at least one of an accelerometer and a magnetometer.

In some implementations of the drill guidance device, one of the formation properties is a formation permeability.

In some implementations of the drill guidance device, the formation permeability can be based on the formation sensor data received from a porosity sensor.

In some implementations of the drill guidance device, one of the formation properties is a formation thickness.

In some implementations of the drill guidance device, the formation thickness may be based on the formation sensor data received from a resistivity sensor or a conductivity sensor.

In some implementations of the drill guidance device, the circuitry may be further configured for manual guidance of the drill.

In some implementations of the drill guidance device, the circuitry may be further configured to determine at least one of the slant angle and/or the formation property to increment, determine a first productivity index from the slant angle and/or the formation property, determine a second productivity index from an incremented slant angle and/or an incremented formation property, and determine the corrected drill angle corresponding to the greater of the first productivity index and the second productivity index.

In some implementations of the drill guidance device, the first productivity index or the second productivity index (J) is defined by:

$$J = \frac{kh}{141.2\left[\ln\left(\frac{r_e}{r_w}\right)\right]} + 0.0025\left[h^{0.65}k^{0.52}\left(\tan\frac{\theta}{4}\right)^{1.22}\right]^{1.9267},$$

in which $r_e$ is a drainage radius or an external boundary radius and $r_w$ is a wellbore radius, slant angle is $\theta$, formation permeability is k, and formation thickness is h.

In some implementations of the drill guidance device, the circuitry is further configured to recursively calculate the second productivity index when the second productivity index is less than the first productivity index.

In some implementations of the drill guidance device, the circuitry is further configured to determine the corrected drill angle based on a productivity index predictively calculated by accessing historical data from memory.

In some implementations of the drill guidance device, the corrected drill angle is based on a continuously calculated productivity index in a measuring while drilling operation.

According to another aspect, the present disclosure includes a method to control a trajectory of a drill that comprises determining a slant angle of a drill based on directional sensor data received from one or more sensor devices, determining one or more formation properties based on formation sensor data received from the one or more sensor devices, calculating a corrected drill angle based on the slant angle and the formation properties, and outputting the corrected drill angle to a drill controller configured to control an angle of trajectory of the drill.

In some implementations of the method, the corrected drill angle is based on a productivity index (J) calculated as a function of the slant angle and at least one of a formation permeability and a formation thickness.

In some implementations of the method, the productivity index (J) is calculated based on the function:

$$J = \frac{kh}{141.2\left[\ln\left(\frac{r_e}{r_w}\right)\right]} + 0.0025\left[h^{0.65}k^{0.52}\left(\tan\frac{\theta}{4}\right)^{1.22}\right]^{1.9267},$$

in which $r_e$ is a drainage radius or an external boundary radius and $r_w$ is a wellbore radius slant angle is θ, formation permeability is k, and formation thickness is h.

In some implementations of the method, the productivity index is recursively calculated.

In some implementations of the method, calculating the corrected drill angle further includes incrementing at least one of the slant angle and/or the formation properties to form a second slant angle and/or a second formation property. As used herein the descriptor "second" when describing slant angle, formation permeability, or formation thickness, may be used interchangeably with the word "incremented."

In some implementations of the method, the method can also include calculating a first productivity index with the slant angle and/or the formation property and a second productivity index with the second slant angle and/or the second formation property and determining when the second productivity index is greater than the first productivity index.

In some implementations, the method also includes determining the corrected drill angle associated with the second formation property and/or the second slant angle when the second productivity index is greater than the first productivity index.

According to an aspect, a non-transitory computer readable medium having instructions stored therein that, when executed by one or more processors, cause the one or more processors to perform a method of controlling a trajectory of a drill by a drilling guidance device, the method comprises determining a slant angle of a drill based on directional sensor data received from one or more sensor devices, determining one or more formation properties based on formation sensor data received from the one or more sensor devices, controlling an angle of trajectory of the drill based on a corrected drill angle calculated recursively based on the slant angle and the formation properties, and producing an output of the corrected drill angle to a drill controller.

The foregoing paragraphs have been provided by way of general introduction, and are not intended to limit the scope of the following claims. The described implementations, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
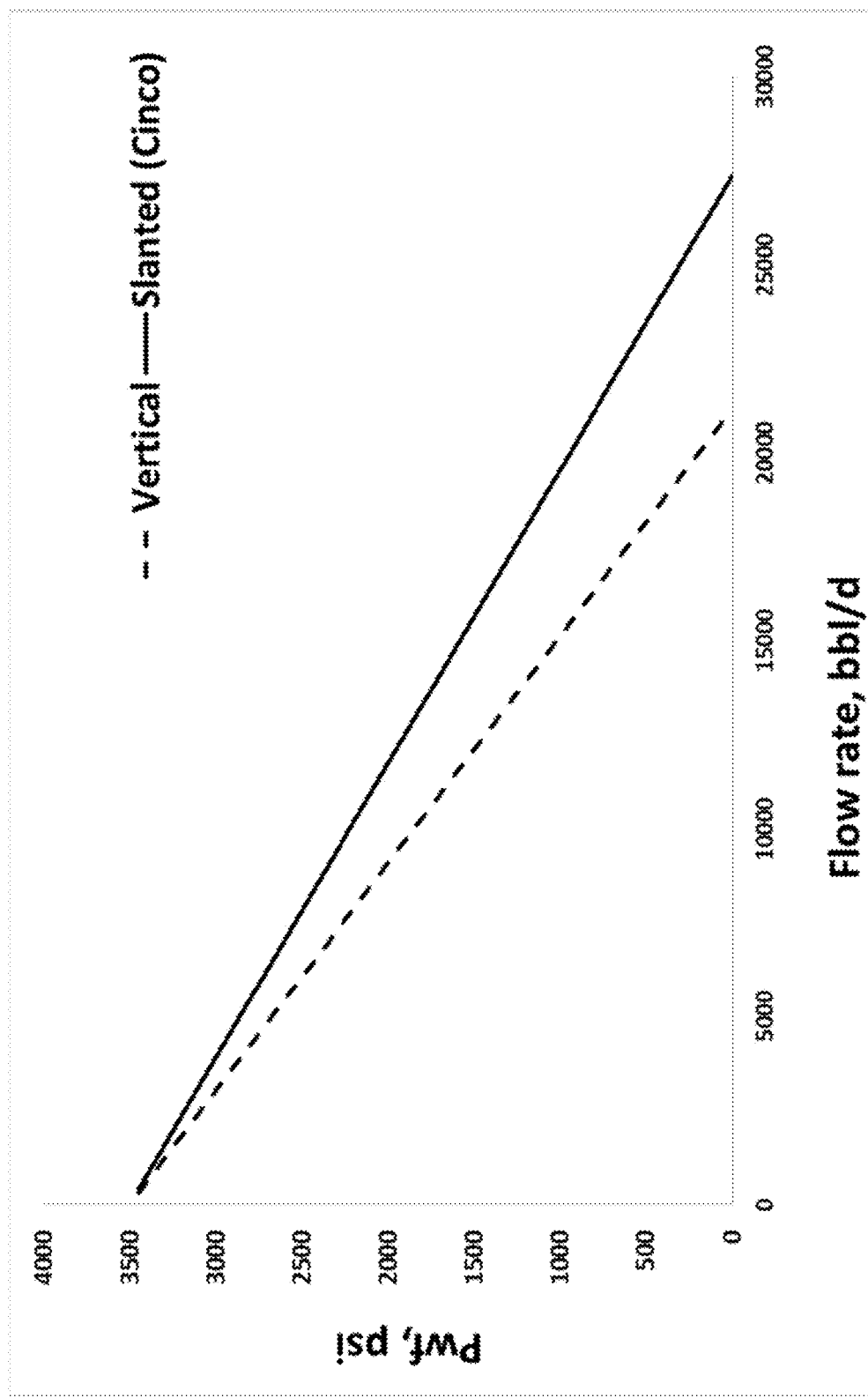
FIG. 1 is an exemplary graph of a model of productivity index for a vertical well and slanted well.

Referring now to the drawings, wherein like reference numerals designate identical or corresponding parts throughout the several views.

Aspects of the present disclosure are directed to a drill guidance device with circuitry that is configured to determine a slant angle of a drill based on directional sensor data collected from one or more sensors, determine one or more formation properties based on formation sensor data received from one or more sensors, and control an angle of trajectory of a drill based on a corrected drill angle calculated based on the slant angle and the formation properties. The drill guidance device can be electronically connected to a drill controller which can transmit an electronic signal to control a drill by changing an angle of trajectory of the drill. The sensors from which directional data and formation properties are collected can be located on the drill, but may also be at a distal location and electronically connected to the drill guidance device. The drill guidance device can be configured to work in conjunction with manual operation as well as autonomous operation without human intervention.

According to one implementation, the drill guidance device depends on several properties from which a corrected drill angle can be calculated. The drill guidance device may employ a measurement of a slant angle from a directional sensor including, but not limited to an accelerometer and a magnetometer. The drill guidance device may also employ a measurement of formation properties, such as formation permeability and formation thickness. In one implementation the formation permeability measurement is based on the formation sensor data received from a porosity sensor. In one implementation the formation thickness measurement is based on a formation sensor. In some implementations the formation sensor measures density and chemical signatures of a rock formation to determine the type of geological material at a drill site. In one implementation the data obtained from the sensors is electronically transmitted to the circuitry of the drill guidance device.

To determine the correct drill angle the device can use a function based on the slant angle and formation properties. To derive this function, a series of iterative procedures were executed to refine previously reported equations to derive one that can be used for drill guidance.

Accordingly, the model proposed here, referred to as a drill guidance model, can estimate PI or II of these two types of water wells commonly used in the oil industry. Development of drill guidance model described herein can be applied to slanted/highly-deviated water supplies and water injection wells. The drill guidance model is based on simulation modeling of several wells/reservoirs' scenarios that resulted in proposing a method for better estimation of the IPR of an isotropic and homogenous reservoirs having water supply or water injection slanted/highly-deviated wells. In deriving the drill guidance model, instead of calculating the pseudo-skin caused by the well slant, incremental PI/II is calculated and added to that of a vertical well with the same reservoir characteristics. Cinco model was used as the basis in deriving the correlation. The drill guidance model proved its reliability in predicting the IPR for several examples of data and was compared to Cinco model.

In deriving the equations for the drill guidance model, the effect of well inclination can be formulated as a function of slant angle, reservoir thickness and average permeability. These three parameters can be assembled together as a block to form a parameter denoted as (MP). In one implementation, a trial-and-error approach can be used to determine a relationship between the MP and dJ that produces a drill guidance model that is able to predict the inflow performance for isotropic and homogenous water reservoirs. The drill guidance model proved its reliability in estimating IPR of slanted water-supplying and water-injection wells in comparison to the Cinco model for a wide range of reservoir and well characteristics. The present disclosure is directed to a device that employs the drill guidance model.

Rather than correcting the vertical IPR via the pseudo skin induced by the slanted and highly-deviated well, an empirical correlation can be generated based on a Cinco model to express deviation effect as an additional productivity/injectivity as a function of one or more reservoir parameters. The empirical correlation, used interchangeably herein with "the empirical model," can be generated using results from a simulated base case, then conducting sensitivity analysis of several reservoir parameters to create the drill guidance model which can be compared with the productivity index as predicted by the Cinco model. The empirical model refers to any model that is described herein for testing. The empirical model which achieves the best correlation with the Cinco model will be referred to as the drill guidance model.

Drilling a slanted and highly-deviated water supply and/or water injection wells through the pay zone can increase the reservoir exposed surface area opened to flow, which can result in an increased IPR. This additional flow reflects an additional productivity index (J) from that of a vertical well:

$$J_{slant} = J_{vertical} + dJ \qquad (8)$$

Where $J_{slant}$ is the Productivity/Injectivity Index for the slanted water well (STB/DAY/PSI), $J_{vertical}$ is the Productivity/Injectivity Index for the vertical water well (STB/DAY/PSI), and dJ is the change in the Productivity/Injectivity Index due to the slanted/highly-deviated nature of the water well (STB/DAY/PSI).

FIG. 1 is an example of the comparison of two well models to be drilled in a certain reservoir; a vertical well and a slanted well with an angle of 50° using Cinco correction pseudo skin factor. The graph illustrates the increase in the productivity as measured by the empirical model, created when the well deviates with a predetermined angle. The empirical model increases productivity (dJ) resulting from the well deviation, and to correlate the productivity with the slant angle value; in other words, to make (dJ) behave as a function of slant angle ($\theta$).

In one implementation, assumptions can be made related to determining productivity for wells having slanted angles. For example, one assumption is that the reservoir under study is isotropic and homogenous under steady-state condition where the permeability in every direction (x, y, z) is equal and constant. The second assumption is that the reservoir is a water reservoir if the well is a water supply or an oil reservoir with water injector drilled in the aquifer area to support the reservoir pressure. The third assumption is that in all calculations, the viscosity used is 1 centipoise and the formation volume factor is 1 bbl/STB, which are typical values for water injection wells. The preceding assumptions are not limiting and other assumptions can be employed in some implementations.

Figure 2:
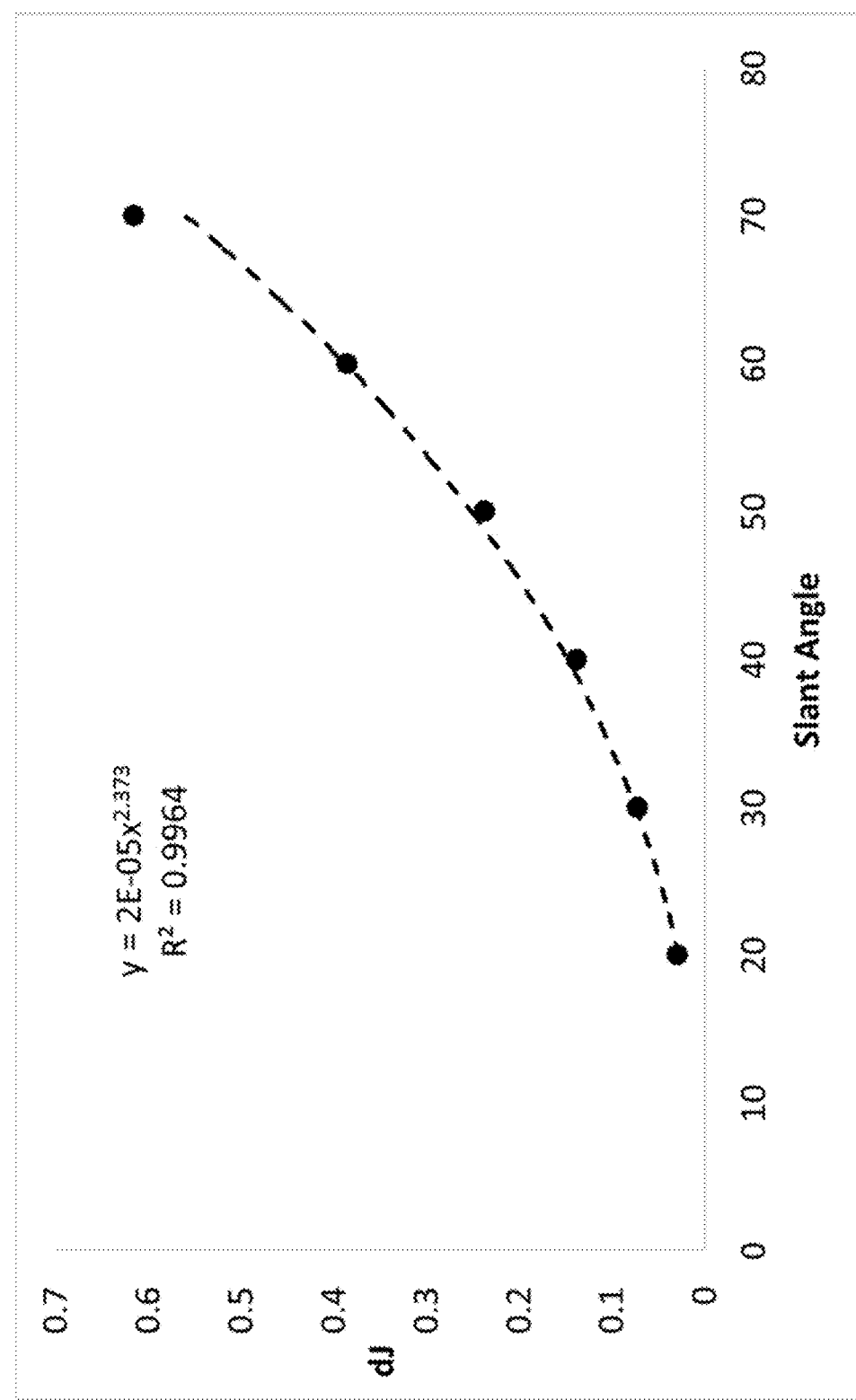
FIG. 2 is an exemplary plot of a model of dJ versus slant angle.

In an example, the first step to create the drill guidance model is to set a base-case of a reservoir and well characteristics: 50 ft of reservoir thickness, permeability of 25 md, 2000 ft of drainage radius, and reservoir pressure of 3000 psi. The difference between the vertical well productivity index and the slanted well productivity index can be calculated for every well slant angle between 20° and 70°. Then, values of (dJ) are plotted against the angle, and the best-representing trend line is drawn through the points and its equation can be determined using non-linear regression technique, which is illustrated in FIG. 2. The model is:

$$dJ = 2e - 5 \, \theta^{2.373} \qquad (9)$$

Therefore:

$$J = \frac{kh}{141.2B\left[\ln\left(\frac{r_e}{r_w}\right)\right]} + 2e - 5\theta^{2.373} \qquad (10)$$

As can be seen from equation (1), the parameters which affect the productivity index for water supply and/or water injection wells in equation (1) can include slant angle ($\theta$), permeability (k), thickness (h), drainage radius ($r_e$), and wellbore radius ($r_w$).

To check the validity and strength of this initial model, equation (1) was applied to predict the productivity index for different water wells' cases, and the results are presented in Table (1). The first test conducted on this model was to calculate (PI) and compare it with (PI) predicted by the Cinco model for the base case upon which the model was initially based. Case (1) in Table (1) shows that the initial model gives an estimate for the productivity index. However, from cases (2) and (3) in Table (1) it is observed that (dJ), from equation (9), may not be solely sensitive to slant angle. When equation (10) was used to calculate (PI) for different permeability and thickness, the estimated (PI) indicated an inaccuracy in comparison to (PI) estimated by Cinco model. So, permeability and thickness both have effects on (dJ), and can be included in addition to slant angle in the drill guidance model. Viscosity, formation volume factor and wellbore radius are held constant for water injection and/or water supply wells, and correlation may be unnecessary. Drainage radius shows very slight effect on the PI.

From this sensitivity analysis, the incremental productivity (dJ) caused by the well deviation can be a function of the slant angle (θ), the average permeability (k), and thickness of the reservoir (h). The function can be written as:

$$dJ = f(\theta, k, h) \quad (11)$$

TABLE 1

Sensitivity analysis for model parameters

| Case | 1 | 2 | 3 | 4 | 5 |
|---|---|---|---|---|---|
| Slant angle | 26° | 42° | 50° | 63° | 32° |
| Permeability (md) | 25 | 300 | 25 | 25 | 25 |
| Thickness (ft) | 50 | 50 | 150 | 50 | 50 |
| Viscosity (cp) | 1 | 1 | 1 | 6 | 1 |
| Formation volume factor (bbl/STB) | 1 | 1 | 1 | 1 | 1 |
| Drainage radius (ft) | 2000 | 2000 | 2000 | 2000 | 3500 |
| Wellbore radius (ft) | 0.3 | 0.3 | 0.3 | 0.3 | 0.3 |
| PI by Cinco (bbl/day/psi) | 1.06 | 13.91 | 3.94 | 0.24 | 1.02 |
| PI by initial model (bbl/day/psi) | 1.05 | 12.21 | 3.23 | 0.54 | 1.02 |

Equation (10) may be inaccurate when applied to various types of reservoirs because it was a function of slant angle only. Then the parameters of permeability and thickness were included into the drill guidance model. But before that the data for the base case to build the empirical model, are presented in Table (2). In one implementation, permeability, thickness and angle are grouped together to form a parameter that can be called Model Parameter (MP). This (MP) is assumed to be:

$$MP = h \, k \, \sin(\theta) \quad (12)$$

TABLE 2

Data for the base case

| Variable | | Value | Unit |
|---|---|---|---|
| External Boundary Radius | $r_e$ | 2000 | ft |
| Wellbore Radius | $r_w$ | 0.3 | ft |
| Formation Volume Factor | B | 1 | bbl/STB |
| Skin | s | 0 | |
| Viscosity | μ | 1 | cp |
| Slant Angle | θ | 20°, 30°, 40°, 50°, 60°, 70° | |
| Average Permeability | k | 0.01, 0.1, 1, 4, 10, 35, 50, 70, 100, 250, 500, 700, 850, 1000 | md |
| Pay Thickness | h | 10, 15, 30, 50, 75, 90, 120, 250, 400, 500 | ft |

Figure 3:
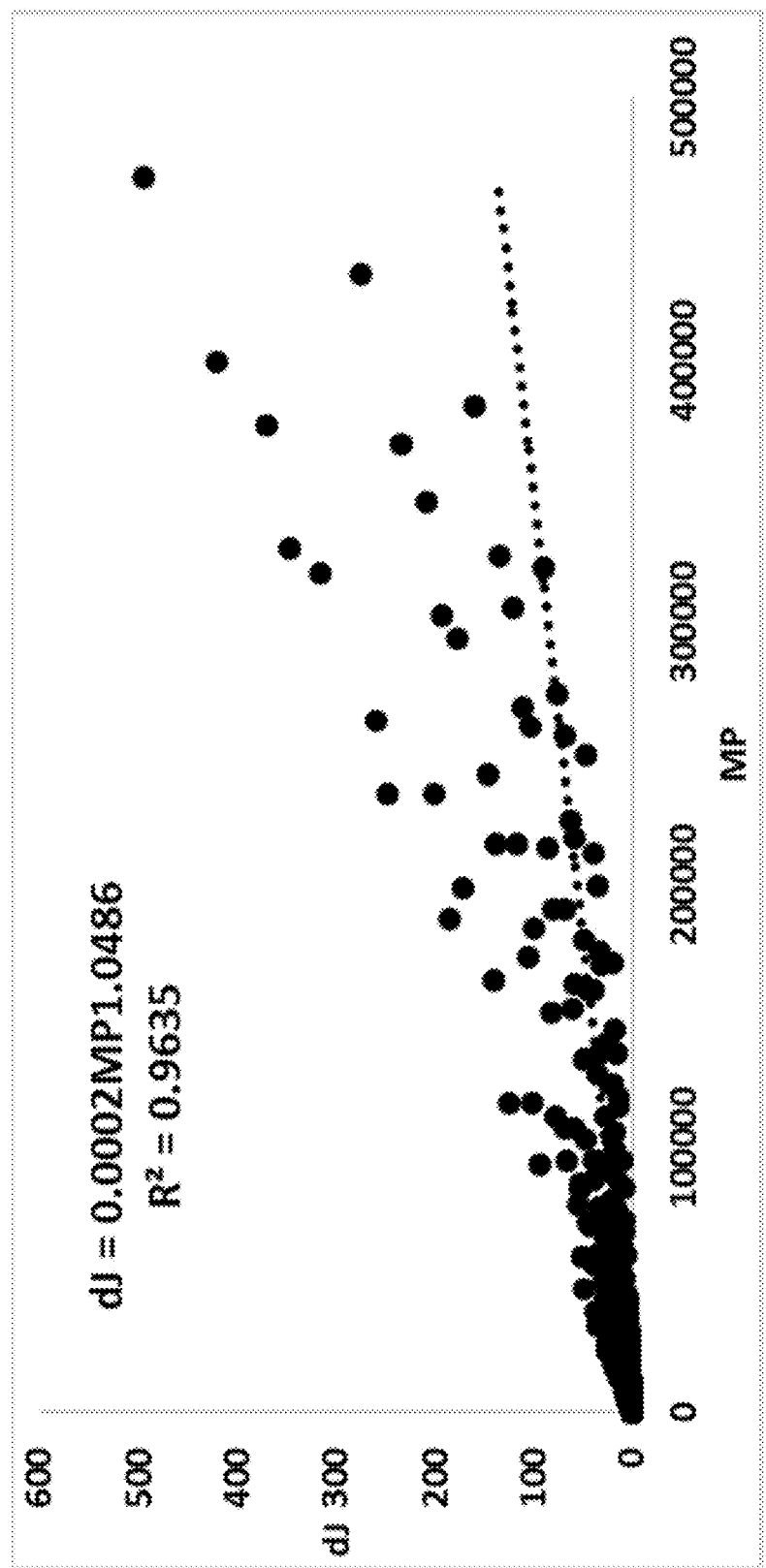
FIG. 3 is an exemplary plot of points between dJ and MP and the equation for the best-fit line representing those points.

The procedures for developing a model that is more accurate can be summarized as follows (1) for all combination of the variables present in table (2), (J) is calculated using Darcy model including 6 selected values of slant angle, 14 permeability values and 10 values for the thickness, which results in 840 cases, (2) for all combination (840 case) of the variables present in table (2), (J) is calculated using the Cinco model, (3) for each case from the combination of the variables, the difference between ($J_{slanted}$) and $J_{vertical}$ is determined, (4) for all combination of variables, (MP) is calculated for each case and then plotted against (dJ), which was determined in the previous step, (5) By using a sort of nonlinear regression, an equation is developed which relates (dJ) with (MP). FIG. 3 highlights the best-fit line. The equation of that best fit line is:

$$dJ = 0.0002 MP^{1.0486} \quad (13)$$

And by substituting in equation (8) the model is described by the following equations:

$$J = \frac{kh}{141.2\left[\ln\left(\frac{r_e}{r_w}\right)\right]} + 0.0002 MP^{1.0486} \quad (14)$$

$$J = \frac{kh}{141.2\left[\ln\left(\frac{r_e}{r_w}\right)\right]} + 0.0002(hk\sin(\theta))^{1.0486} \quad (15)$$

Equation (15) incorporates the parameters of slant angle, thickness and permeability and the parameters can be involved to calculate the additional productivity, and eventually, the slanted well productivity.

In the next iteration, by using the trial-and-error approach, the term (MP) is changed and all the previous steps are repeated in order to improve the model and minimize the error. A series of attempts and trials were conducted to improve the accuracy of the model and the results are recorded in Table (3).

Figure 4:
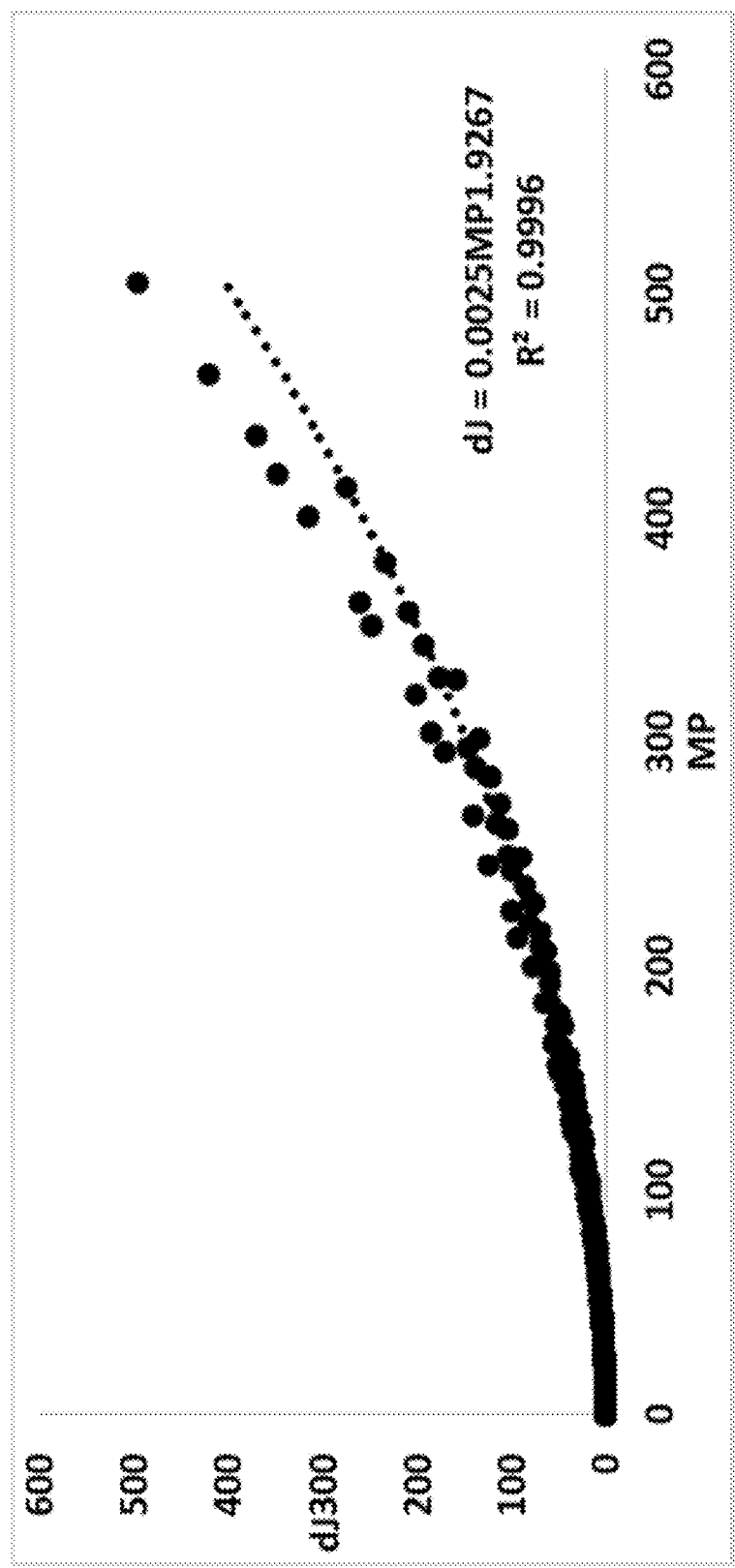
FIG. 4 is an exemplary plot of points between dJ and MP and the equation for the best-fit line representing those points.

As a result of the analysis, the empirical model with the highest coefficient of determination, as appearing in FIG. 4, was chosen to make approximate calculations of productivity/injectivity in this study. Hence, the full form of the drill guidance model that can be employed to predict the productivity index for slanted and highly-deviated water well can be written as:

$$J = \frac{kh}{141.2\left[\ln\left(\frac{r_e}{r_w}\right)\right]} + 0.0025\left[h^{0.65} k^{0.52} \left(\tan\frac{\theta}{4}\right)^{1.22}\right]^{1.9267} \quad (16)$$

Equation (16), which is the drill guidance model, can be represented in a way that productivity/injectivity of a deviated water well equals the productivity/injectivity of a vertical water well with an equivalent thickness. This equivalent thickness can be derived from equation (16) as:

$$h_{equivalent} = h + \frac{0.353}{k}\left[\ln\left(\frac{r_e}{r_w}\right)\right]\left[h^{0.65} k^{0.52}\left(\tan\frac{\theta}{4}\right)^{1.22}\right]^{1.9267} \quad (17)$$

For example, a water well with an angle of 35° drilled through a reservoir having a permeability of 80 md, thickness of 120 ft, external radius of 1500 ft and 3500 psi pressure is going to have a productivity/injectivity index of:

$$J = \frac{80 \times 120}{141.2\left[\ln\left(\frac{1500}{0.3}\right)\right]} + 0.0025\left[120^{0.65} \times 80^{0.52}\left(\tan\frac{35}{4}\right)^{1.22}\right]^{1.9267} =$$

8.98 bbl/day/psi

Using Cinco model, PI will be:

J=9.01 bbl/day/psi

Using equation (17) to calculate thickness of the reservoir that would have the same productivity of 8.98 bbl/day/psi:

$$h_{equivalent} = 120 + \frac{0.353}{80}\left[\ln\left(\frac{1500}{0.3}\right)\right]\left[120^{0.65} \times 80^{0.52}\left(\tan\frac{35}{4}\right)^{1.22}\right]^{1.9267} = 135 \text{ ft}$$

The productivity/injectivity of a vertical water well penetrating a reservoir having a thickness of 135 ft is:

$$J = \frac{80 \times 135}{141.2\left[\ln\left(\frac{1500}{0.3}\right)\right]} = 8.98 \text{ bbl/day/psi}$$

When it comes to the injector wells, equation (16) can be used to predict their injectivity index if they inject water. Similarly, the drill guidance model in this case may estimate the additional injectivity, caused when the well penetrates the reservoir directionally, and add the additional injectivity to the injectivity of a vertical well.

TABLE 3

Model Development Through Several Trials

| Assumed Form for (MP) | Generated Equation from Nonlinear Regression | Coefficient of Determination ($R^2$) |
|---|---|---|
| MP = hk sin(θ) | dJ = 0.0002MP$^{1.0486}$ | 0.9635 |
| MP = √hk sin(θ) | dJ = 0.0003MP$^{2.0934}$ | 0.9862 |
| MP = √hk [sin(θ)]$^2$ | dJ = 0.0009MP$^{1.9855}$ | 0.9819 |
| MP = √hk sin(θ) | dJ = 0.0002MP$^{2.0973}$ | 0.9635 |
| MP = √hk [sin(θ)]$^{1.5}$ | dJ = 0.0005MP$^{2.054}$ | 0.9918 |
| MP = h$^{0.8}$k$^{0.7}$ [sin(θ)]$^2$ | dJ = 0.0002MP$^{1.4517}$ | 0.997 |
| MP = h$^{0.9}$k$^{0.7}$ [sin(θ)]$^2$ | dJ = 0.0001MP$^{1.426}$ | 0.9981 |
| MP = h$^{0.6}$√k [sin(θ)]$^2$ | dJ = 0.0002MP$^{2.0118}$ | 0.9978 |
| MP = h$^{0.65}$k$^{0.52}$ [sin(θ)]$^{1.52}$ | dJ = 0.0002MP$^{1.9259}$ | 0.9982 |
| MP = h$^{0.65}$k$^{0.52}$ $\left[\sin\left(\frac{\theta}{2}\right)\right]^{1.4}$ | dJ = 0.0008MP$^{1.9163}$ | 0.999 |
| MP = h$^{0.67}$k$^{0.52}$ $\left[\sin\left(\frac{\theta}{2}\right)\right]^{1.4}$ | dJ = 0.0007MP$^{1.9066}$ | 0.999 |
| MP = h$^{0.6}$k$^{0.4}$ $\left[\sin\left(\frac{\theta}{3}\right)\right]^{1.4}$ | dJ = 0.0034MP$^{2.3261}$ | 0.9866 |
| MP = h$^{0.65}$k$^{0.5}$ $\left[\sin\left(\frac{\theta}{3}\right)\right]^{1.25}$ | dJ = 0.0013MP$^{1.9873}$ | 0.9993 |
| MP = h$^{0.65}$k$^{0.5}$ $\left[\sin\left(\frac{\theta}{4}\right)\right]^{1.2}$ | dJ = 0.0024MP$^{1.9917}$ | 0.9993 |
| MP = h$^{0.65}$k$^{0.5}$ $\left[\sin\left(\frac{\theta}{5}\right)\right]^{1.2}$ | dJ = 0.0041MP$^{1.9912}$ | 0.9993 |
| MP = h$^{0.65}$k$^{0.5}$ $\left[\sin\left(\frac{\theta}{3}\right)\right]^{1.25}$ | dJ = 0.0013MP$^{1.9783}$ | 0.9992 |
| MP = h$^{0.65}$k$^{0.52}$ $\left[\sin\left(\frac{\theta}{4}\right)\right]^{1.2}$ | dJ = 0.0023MP$^{1.9289}$ | 0.9995 |
| MP = h$^{0.65}$k$^{0.52}$ $\left[\sin\left(\frac{\theta}{4}\right)\right]^{1.22}$ | dJ = 0.0025MP$^{1.9267}$ | 0.9996 |

Equation (16) can predict the productivity/injectivity for slanted and highly-deviated water wells in a way that is comparable to Cinco model. The drill guidance model may produce reliable estimates for the following ranges of reservoir and well conditions including pay thickness from 10 ft to 800 ft, permeability from 0.01 to 1000 md, and zero skin.

In one implementation, the drill guidance model can be applicable with some constraints related to the drainage radius. For example, the drill guidance model may predict the productivity/injectivity for a deviated well by an angle between 20° to 70° when the drainage radius is greater than 1500 ft.

Figure 5:
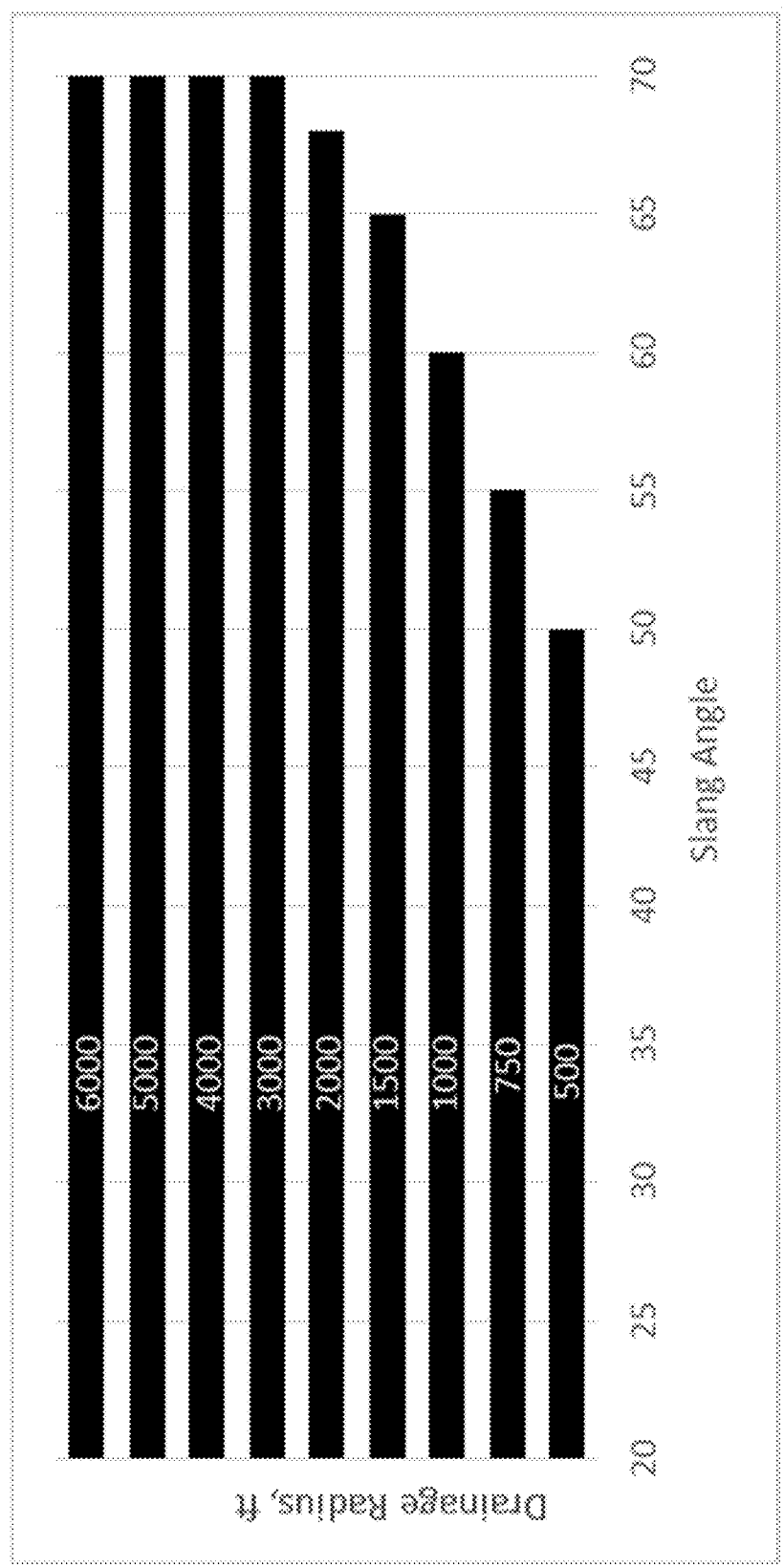
FIG. 5 is an exemplary plot of ranges of applicability for a model of drainage radii.

In another implementation, the reservoirs with smaller external radius the range of slant angles on which the drill guidance model can be applicable decreases. For example, when the drainage radius is 500 ft, the drill guidance model can give approximate predictions of productivity for slant angles between 20° and 50°. FIG. 5 illustrates these observations for the drill guidance model's applicable range of slant angles in relation to drainage radii.

Figure 6:
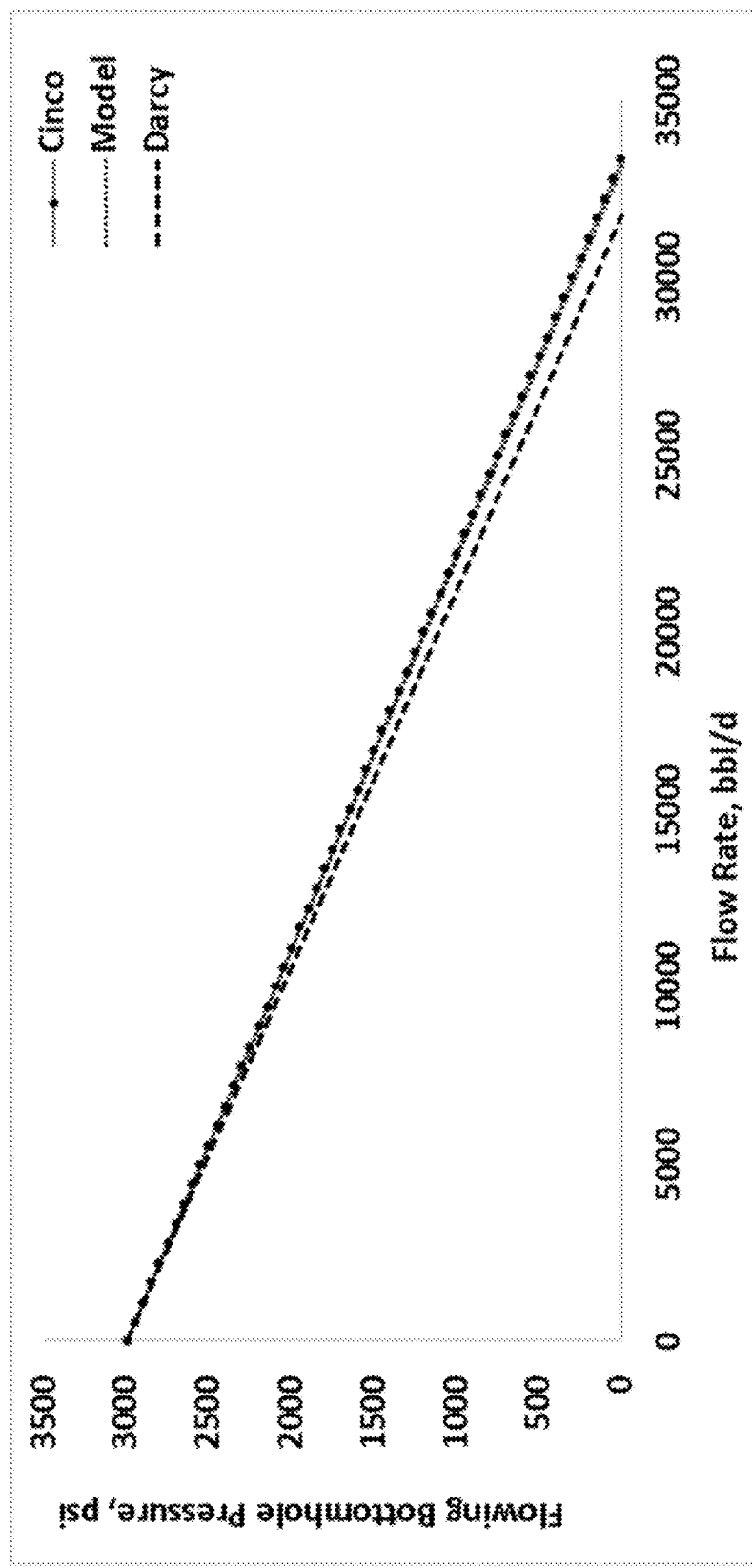
FIG. 6 is an exemplary plot of IPR for a slanted well.
Figure 7:
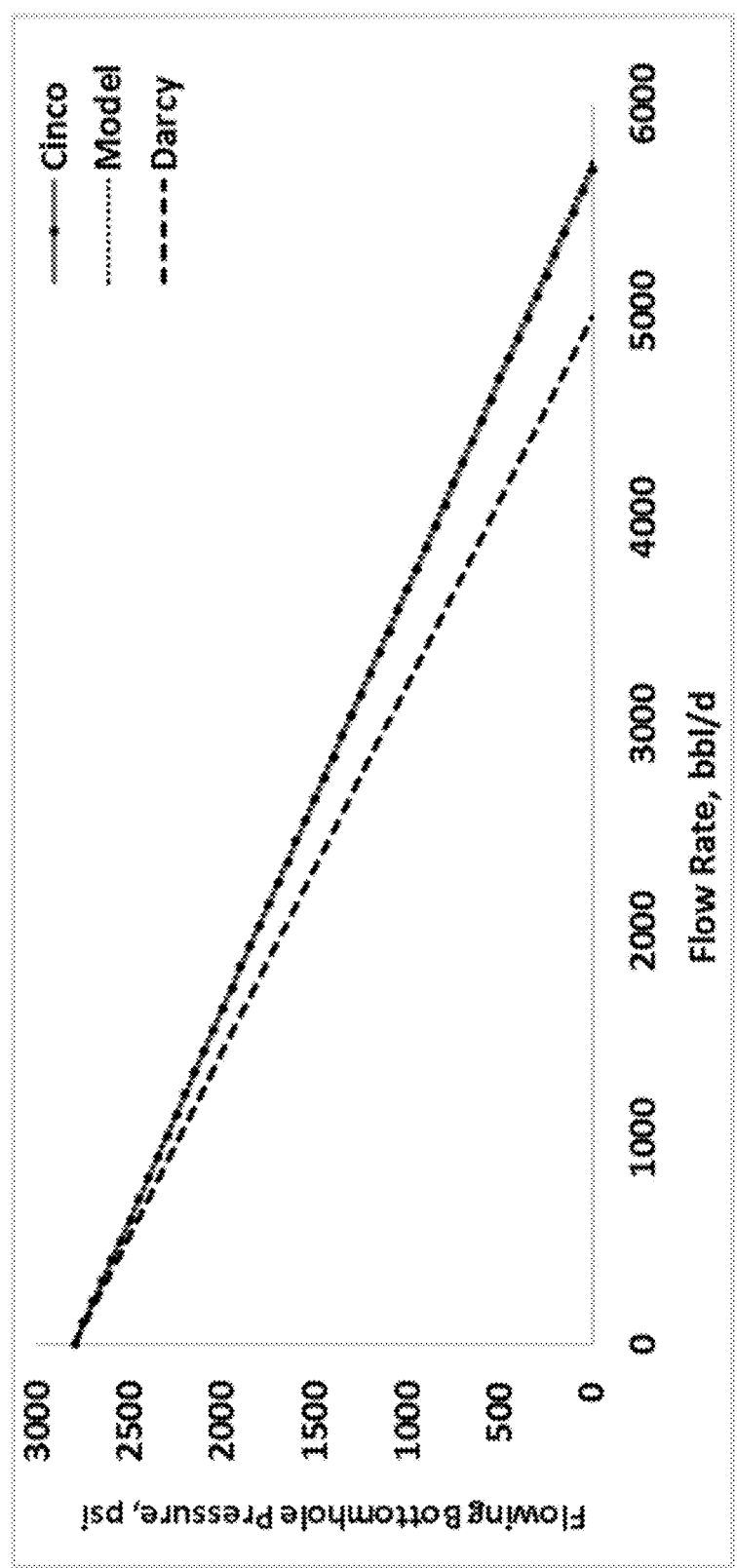
FIG. 7 is an exemplary plot of IPR for a slanted well.
Figure 8:
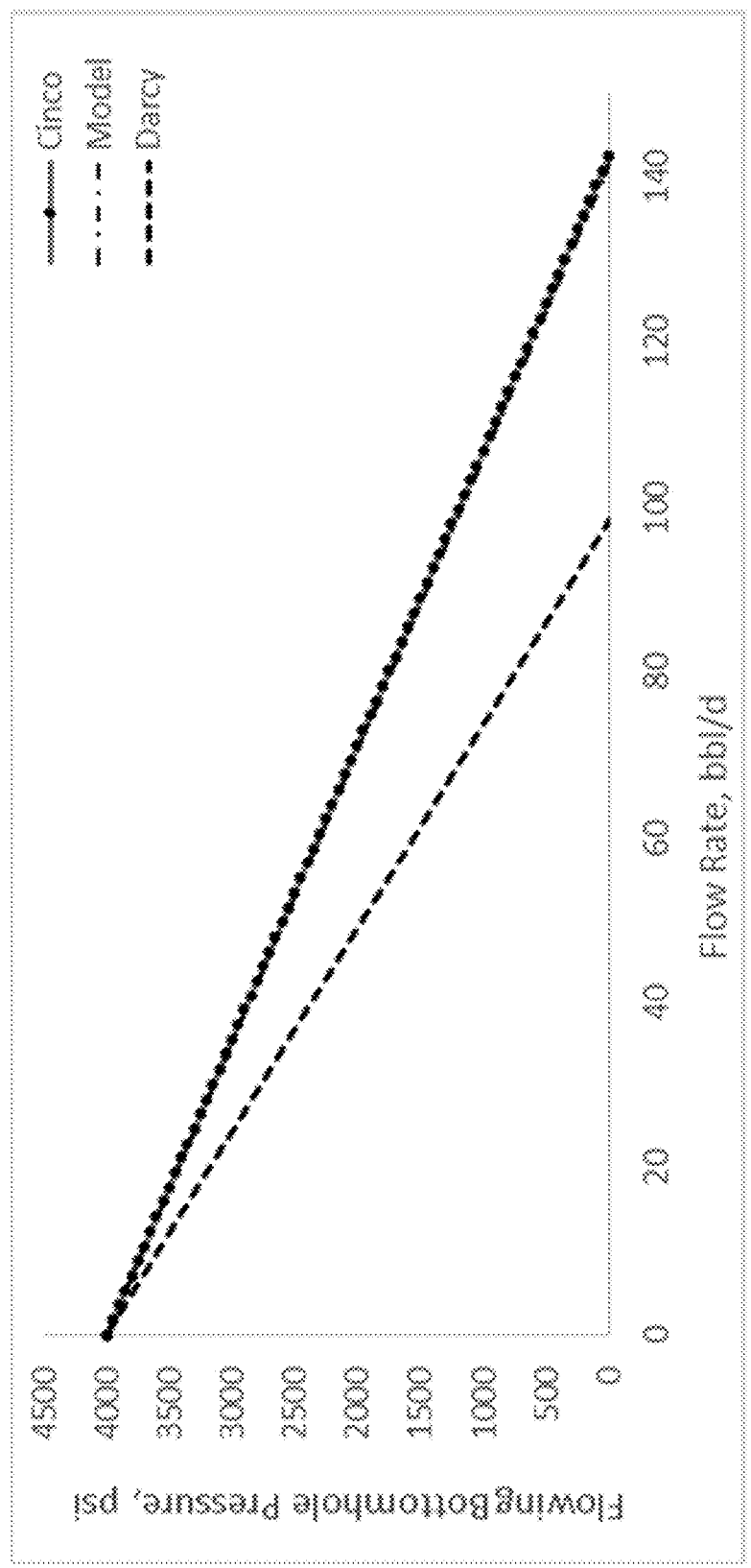
FIG. 8 is an exemplary plot of IPR for a slanted well.
Figure 9:
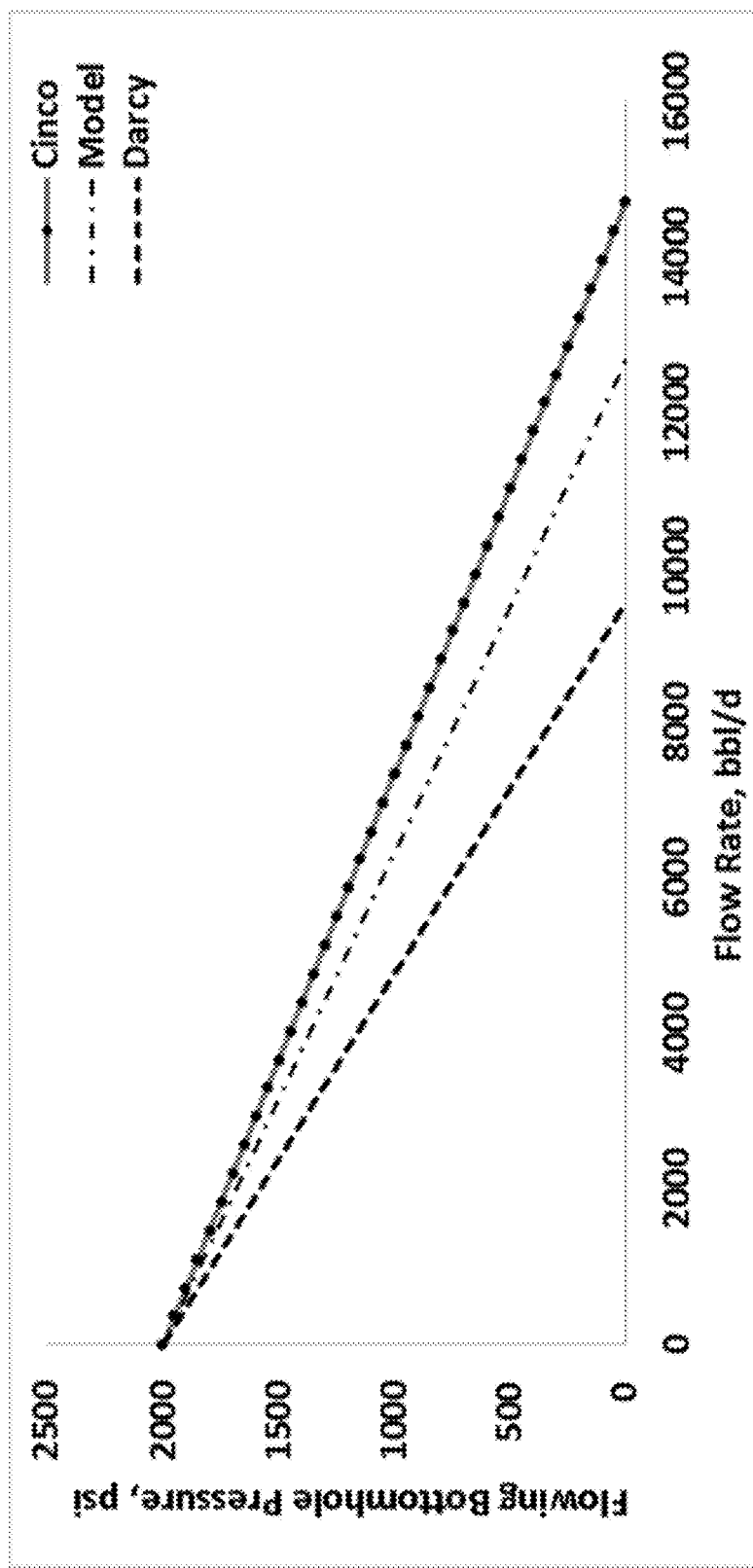
FIG. 9 is an exemplary plot of IPR for a slanted well.
Figure 10:
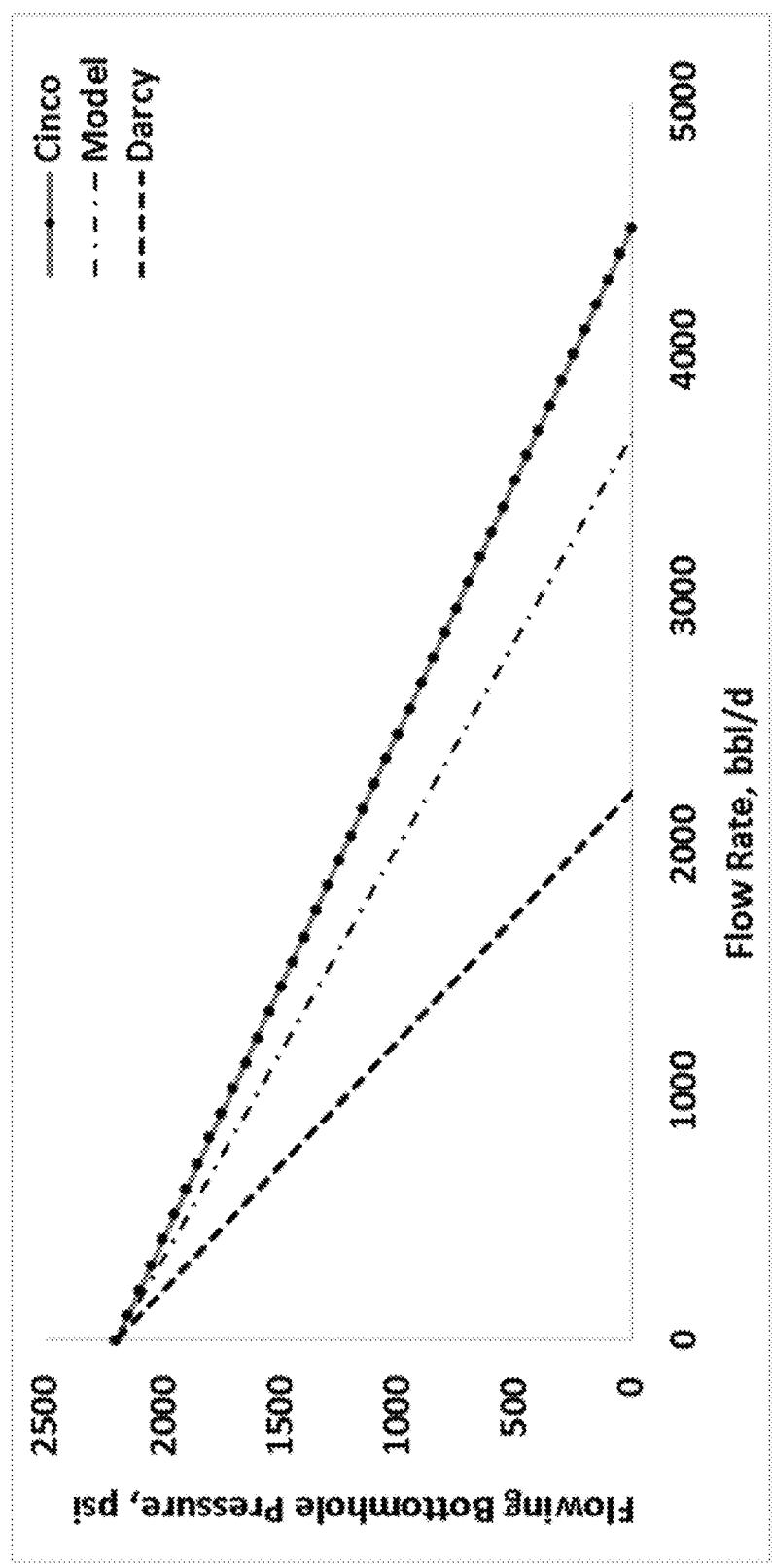
FIG. 10 is an exemplary plot of IPR for a slanted well.
Figure 11:
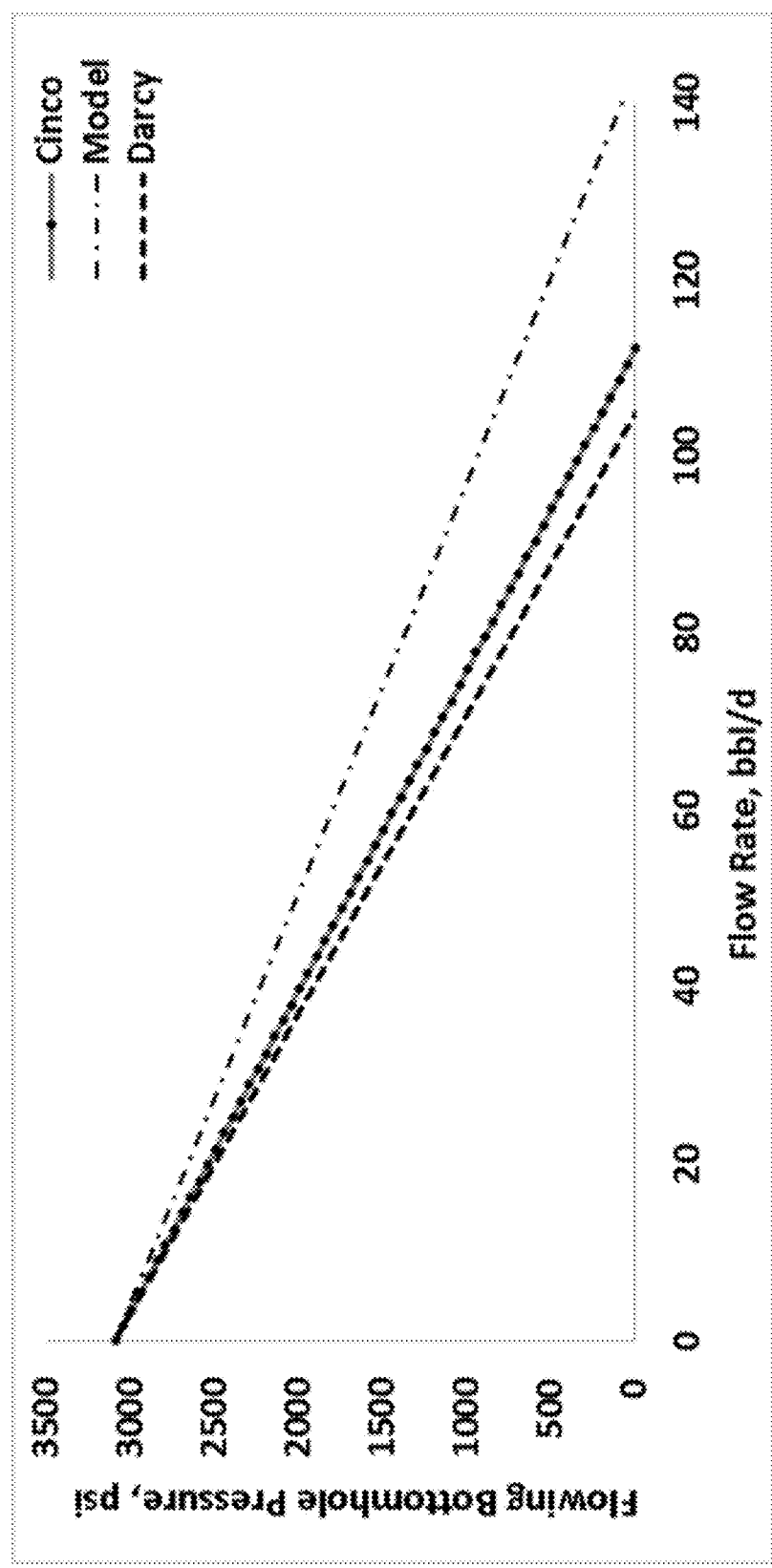
FIG. 11 is an exemplary plot of IPR for a slanted well.

FIGS. 6-8 represent examples for using the model to estimate PI for different reservoir conditions and well geometries within examples of ranges, whereas FIGS. 9-11 are examples of cases which apply the drill guidance model outside of the example ranges of FIGS. 6-8, which resulted in results of lower accuracy than the results of FIGS. 6-8.

TABLE 4

Nomenclature

| | |
|---|---|
| J | Productivity Index |
| θ | Slant Angle |
| s | Skin Factor |
| $s_\theta$ | Slanted Skin |
| h | Formation Thickness |
| k | Absolute Formation Permeability |
| $k_h$ | Horizontal Permeability |
| $k_v$ | Vertical Permeability |
| $k_x$ | Permeability in x Direction |
| $k_y$ | Permeability in y Direction |
| μ | Viscosity |
| q | Flow Rate |
| B | Formation Volume Factor |
| $P_e$ | External Boundary Pressure |
| $P_{wf}$ | Bottomhole Flowing Pressure |
| $r_e$ | External Boundary Radius |
| $r_w$ | Wellbore Radius |
| L | Well Length |

In one implementation the circuitry of the drill guidance device is configured to calculate a corrected drill angle by employing a measurement of the slant angle, formation permeability and formation thickness. The slant angle, the formation permeability, and the formation thickness can be used to determine a PI. The greater value of a first and second PI value, each calculated from at least one different value of slant angle, formation permeability, and formation thickness, determines the corrected drill angle. The circuitry can be configured to employ equation (16), from the derivation provided herein, in the calculation.

Equation (16) also uses terms $r_e$ and $r_w$, which are values of the drainage radius or external boundary radius of a well site and a wellbore radius, which can be pre-set into the equation and are dependent on the drilling site. The preset values for $r_e$ may be between 500 ft and 5000 ft, between 600 ft and 4500 ft, between 700 ft and 4000 ft, between 800 ft and 3750 ft, between 900 ft and 3500 ft, between 100 ft and 3250 ft, between 1100 ft and 3000 ft, between 1200 ft and 2750 ft, between 1300 ft and 2500 ft, between 1400 ft and 2250 ft, between 1500 ft and 2000 ft, between 1600 ft and 1750 ft. The preset values for $r_w$ may be between 0.01 ft and 1 ft, between 0.05 ft and 0.9 ft, between 0.1 ft and 0.8 ft, between 0.15 ft and 0.7 ft, between 0.2 ft and 0.6 ft, between 0.25 ft and 0.5 ft, between 0.3 ft and 0.4 ft. The circuitry is not limited to employing the above equation and can be configured to employ a plurality of equations. In one implementation the circuitry of the drill guidance device is also configured to recursively calculate the PI as sensor data is received to continually calculate a corrected drill angle. In one implementation the recursive calculation allows an autonomously controlled drill to be continually corrected in its angle of trajectory such that the PI is maximized. To determine a maximum PI, the PI can be at least 20% greater than the previous value, at least 18% greater than the previous value, at least 15% greater than the previous value, at least 12% greater than the previous value, at least 10% greater than the previous value, at least 8% greater than the previous value, at least 5% greater than the previous value, at least 2% greater than the previous value, at least 1% greater than the previous value, or any other predetermined percentage greater than the previous percentage.

According to another aspect, a method to control a trajectory of a drill which can determine a slant angle of a drill based on directional sensor data received from one or more sensor devices, determining one or more formation properties based on formation sensor data received from the one or more sensor devices, and controlling an angle of trajectory of the drill based on a corrected drill angle calculated based on the slant angle and the formation properties.

The formation properties can include, but are not limited to formation permeability and formation thickness. The slant angle, formation permeability, and formation thickness can be used to calculate a PI. The greater of two PI values, each of which are a function of at least one different value for slant angle, formation permeability, and formation thickness, determines the corrected drill angle to control the trajectory of a drill.

FIG. 12, FIG. 13A, and FIGS. 14-15 are exemplary flowcharts of processes for controlling a trajectory of a drill. The method to control a trajectory of a drill can be implemented several ways. Two implementations are described herein as examples, and are not intended to be limiting descriptions. One implementation can be a measuring while drilling (MWD) method meaning that while drilling is in progress the method can correct the drill trajectory. Implementation as an MWD may be accomplished by providing the corrected drill angle in a signal to a drill controller and the drill controller can determine the appropriate response to the signal based on a preset threshold to determine whether it is necessary to change the drill trajectory by the corrected angle. The preset threshold may be more than 20% difference between the current drill trajectory and the corrected drill trajectory, more than 15% difference between the current drill trajectory and the corrected drill trajectory, more than 10% difference between the current drill trajectory and the corrected drill trajectory, more than 5% difference between the current drill trajectory and the corrected drill trajectory, more than 3% difference between the current drill trajectory and the corrected drill trajectory, more than 1% difference between the current drill trajectory and the corrected drill trajectory, or any other predetermined percentage greater than the previous percentage. The second implementation may be a predictive method in which the trajectory of the drill is determined prior to drilling.

The corrected drill angle is calculated based on a PI, which can be calculated as a function of the slant angle ($\theta$), the formation permeability (k), and the formation thickness (h). The slant angle ($\theta$), the formation permeability (k), and the formation thickness (h) are measurements that can be determined from measurements by the sensor or manually entered values. The corrected drill angle is determined by a variance in two productivity indices: one PI is calculated on a measurement at a time point and a second PI is calculated on a measurement at a later time point such that ($\theta$), (k), or (h) have changed. If the second PI is greater than the first PI then the corrected drill angle is determined by the difference in the slant angle between the two PI calculations. The corrected drill angle is then transmitted to the drill controller. This process can be performed recursively to continually provide the corrected drill angle based on a positive difference between the second PI and the first PI. A positive difference, as used herein, is the result of a second PI greater than the first PI.

In an implementation of the method, the corrected drill angle is determined by a difference between two productivity indices: one PI is calculated on a measurement made by sensors or other geologic data and a second PI is calculated based on an incremented value of any combination of ($\theta$), (k), or (h) or permutation of ($\theta$), (k), or (h). The corrected drill angle is determined by the difference in the slant angle between the two PI calculations. This process can be recursive to continually provide the corrected drill angle based on a positive difference between the second PI and the first PI. In some implementations of this method the productivity indices of subsequent incremental calculations can be plotted graphically to find the greatest positive difference between two productivity indices. FIGS. 12-15 depict exemplary flow charts showing variations of the calculation of the corrected drill angle.

Figure 12:
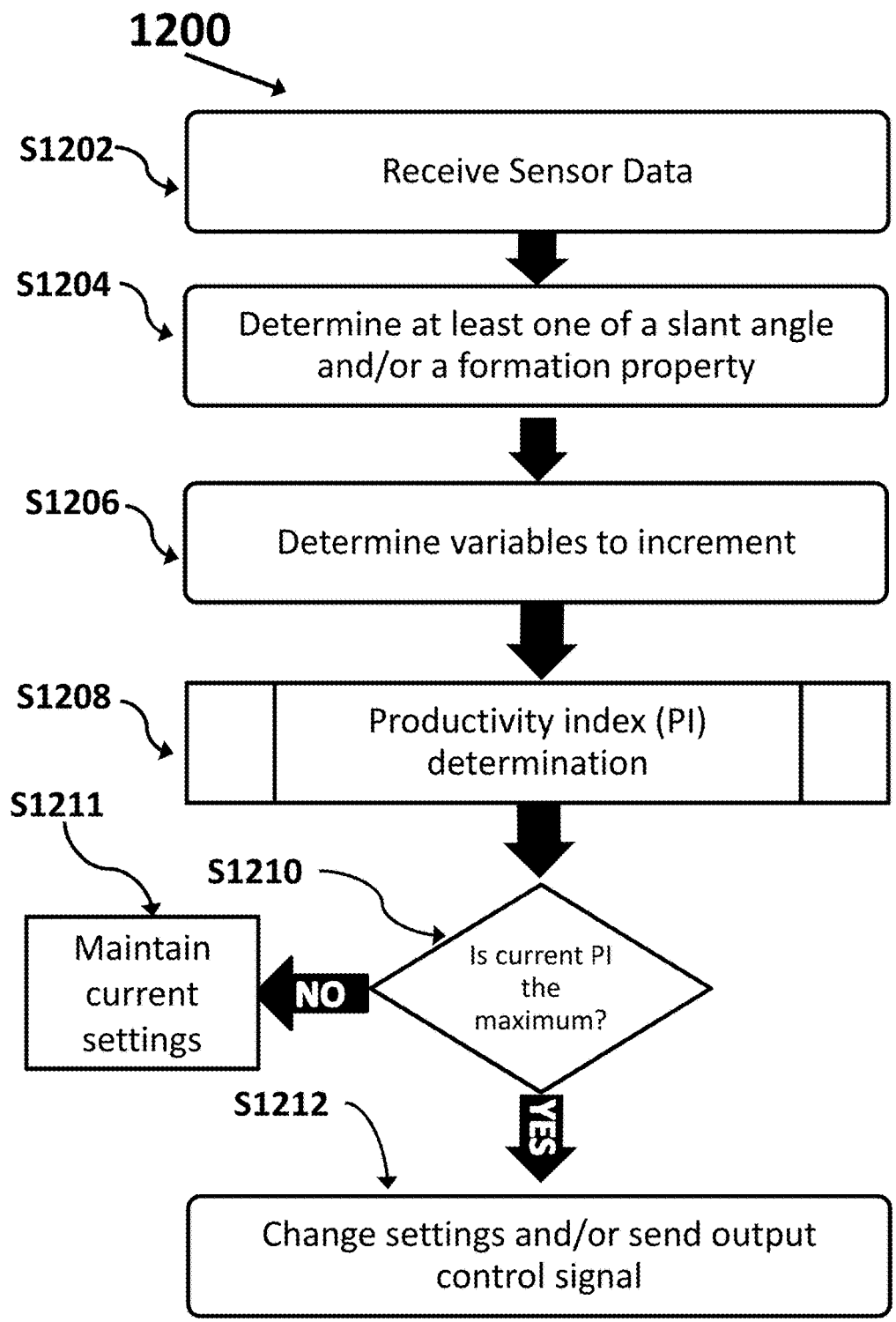
FIG. 12 is a flow chart depicting steps of a method employing the slant angle and/or a formation property to calculate a corrected drill angle.

FIG. 12 depicts a flow chart of a general method 1200 to calculate the corrected drill angle for a predictive method. The first step 1202 is to receive sensor data which can be from mechanical sensors integral to a drill head or connected wirelessly. The sensors data can be received via a wireless connection to a computer which can then process the data.

The next step 1204 is to determine the current values of a slant angle and/or a formation property. The determining requires a calculation of a value for the slant angle and the formation property from the data gathered from the sensors. The determining may also include looking up the values in a database. The values can be assigned to variables ($\theta$), (k), or (h), or any combination of the variables.

The next step 1206 is to determine which variable to increment. The incremented variable can be determined by a human user or a preset algorithm that may use variables ($\theta$), (k), or (h), or any combination of the variables to be incremented. The variables may be incremented by at least 0.5% of its value, at least 1% of its value, at least 3% of its value, at least 5% of its value, at least 10% of its value, at least 15% of its value. In one implementation the variables may be incremented based on historical data obtained from a the database which stores data on comparable reservoir locations.

The next step 1208 is the determination of the PI. The PI is dependent on variables ($\theta$), (k), or (h), or any combination of the variables of the previous steps 1204 and 1206. Step 1208 is a subroutine that is depicted in FIG. 13. Step 1208 can include a recursive step until a maximum PI is determined.

Figure 13A:
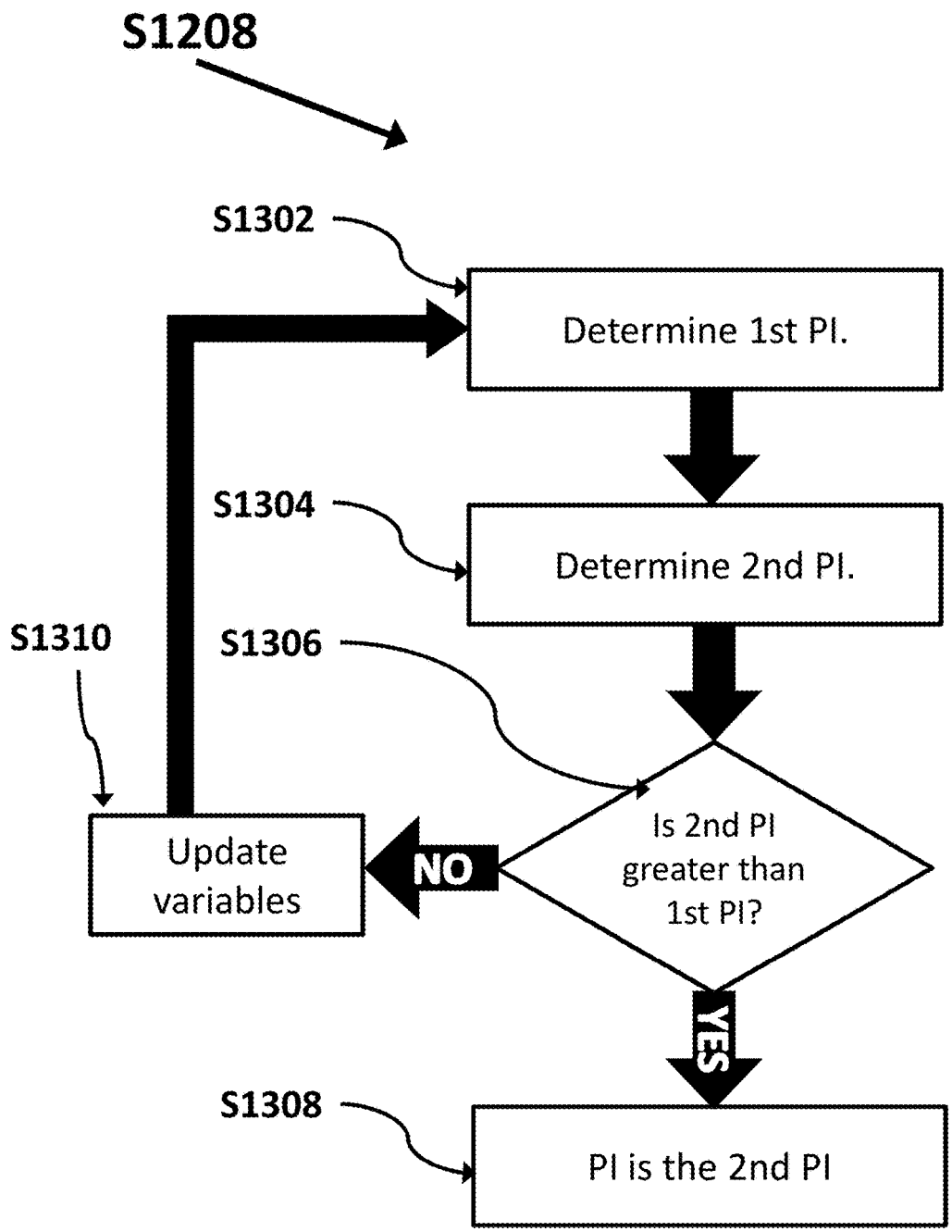
FIG. 13A is a flow chart depicting the steps of a subroutine of a method to determine the greater of two productivity indices to ultimately calculate a corrected drill angle.
Figure 13B:
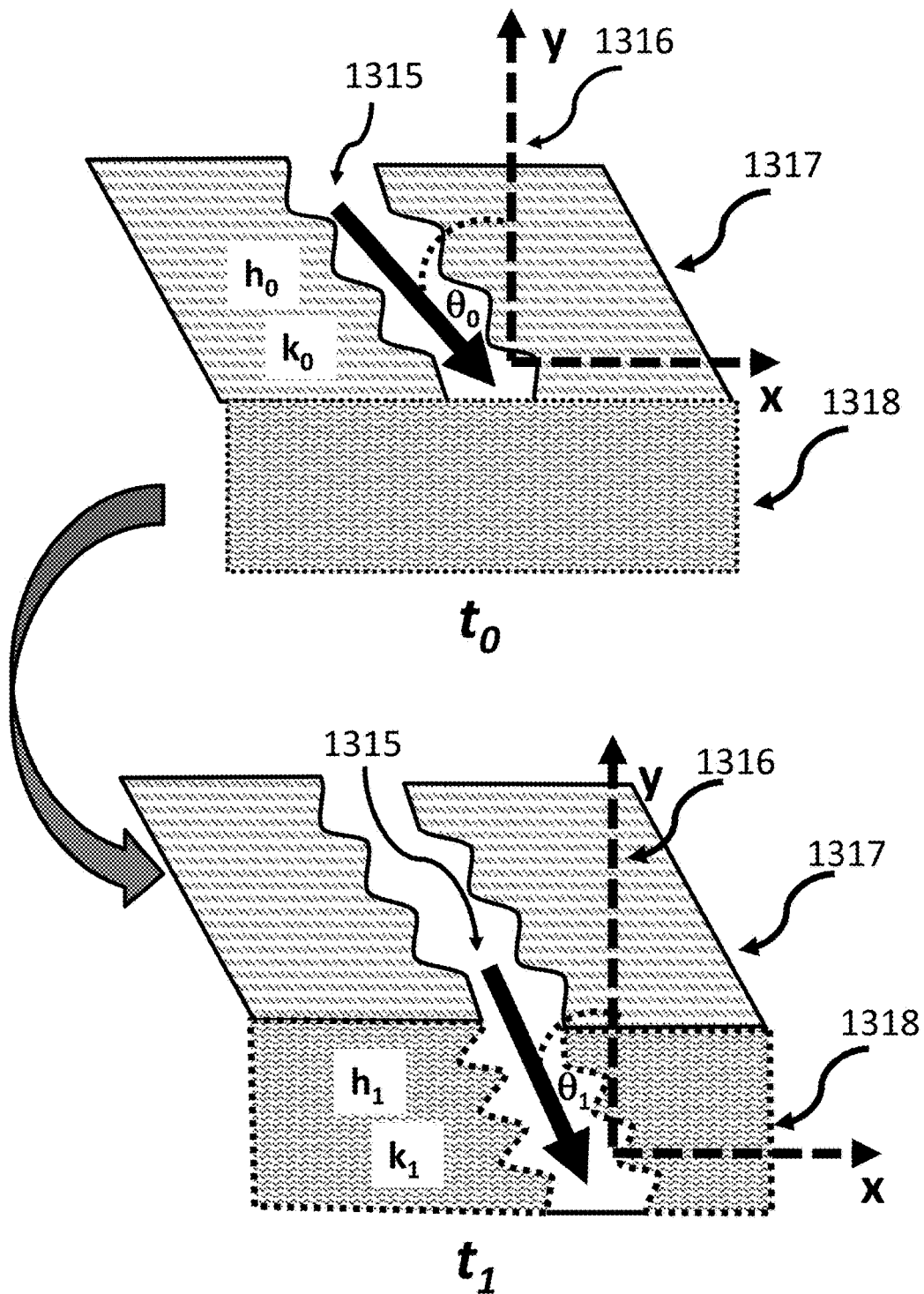
FIG. 13B is a diagram of a snapshot of a drill head.

The subroutine of step 1208 is depicted in FIG. 13A. The input to the first step 1302 of FIG. 13 is to determine a first PI which is a function of the initially determined slant angle and/or formation properties as in step 1204. The second step 1304 is to determine the second PI which can use the values of the variables determined by step 1206. In one implementation equation (16) is the function used to determine the PI in steps 1302 and 1304. Step 1304 may also make a determination of a second PI from sensor data which has changed over time during the drilling process (See FIG. 13B). For example a drill may change the slant angle or the geological formation through which the drill is moving may be composed of a different material, therefore the variables ($\theta$), (k), or (h) may be different. In FIG. 13B an exemplary depiction of a drill 1315 in a slanted well is shown. The slant angle, represented by ($\theta$), can be measured from an axis 1316. The drill moves from one section of a first formation 1317, resulting in a slant angle ($\theta_1$), formation permeability ($k_1$), and formation thickness ($h_1$), at an initial time ($t_0$), then moving into a second formation 1318 resulting in a slant angle ($\theta_2$), formation permeability ($k_2$), and formation thickness ($h_2$), at a later time ($t_1$). As an example, referring to FIG. 13B, in a MWD implementation of the method to determine a corrected angle of trajectory, the first PI in step 1302 can use ($\theta_1$), ($k_1$), ($h_1$) of $t_0$ and the second PI in step 1304 can use ($\theta_2$), ($k_2$), ($h_2$) of $t_1$.

Referring again to FIG. 13A, step 1306 is a decision step to determine if the second PI is greater than the first PI. This step is based on the understanding that a bigger value for the PI correlates to the improved productivity of the oil well. If the decision is "YES" then the maximum PI value is determined to be the second PI value (1308) and the second PI value is the output of the subroutine to be input into step 1210 of FIG. 12. If the decision is "NO" then next step 1310 is to update the variables and return to the beginning of the subroutine at step 1302. This is a recursive implementation of the subroutine, but the subroutine may also be implemented as a non-recursive calculation.

Referring again to FIG. 12, the step 1210 is to decide if the PI determined from the subroutine of 1208 is the maximum of a comparison. If the decision is "YES" the next step 1212 is to change the settings of the variables for the corrected drill angle and/or send a control signal with the corrected drill angle. If the decision from step 1210 is "NO" then the next step 1211 is to maintain the current settings for the variables and thus not changing the angle of trajectory of the drill.

Figure 14:
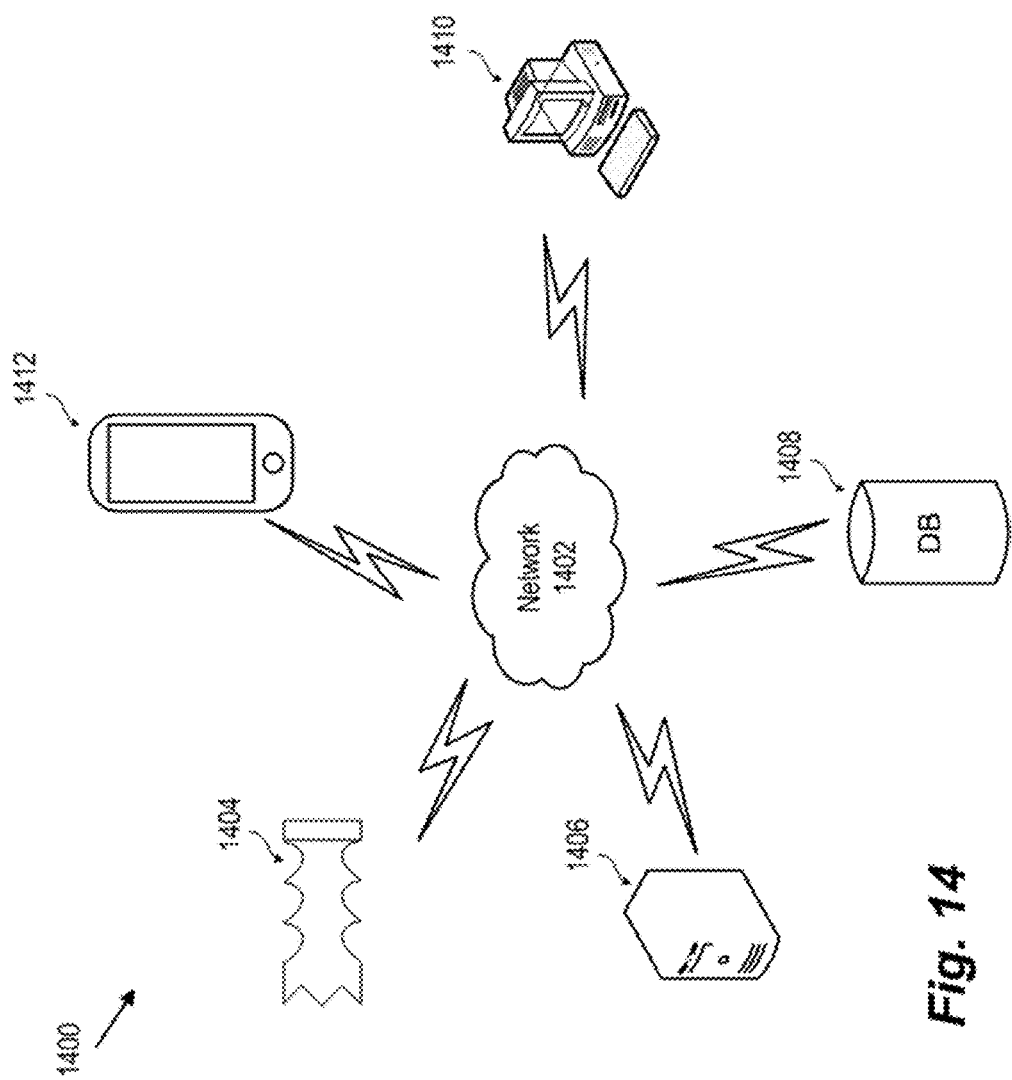
FIG. 14 is an exemplary diagram of the electronic connectivity of the drill 1404 with a number of devices.

FIG. 14 is an exemplary illustration of a drill guidance device system 1400, according to certain implementations. The computer 1410 represents at least one computer 1410 and can act as a drill controller that is connected to a server 1406, which can also be the drill guidance device, a drill 1404, a database 1408, and a mobile device 1412, via a network 1402. In some implementations, the computer 1410 is used to view data collected over various drill guidance implementations. In addition, the computer 1410 can be used by a person to monitor the drill guidance device 1406 and the drill 1404, current drill guidance data, the formation sensors, or the slant angle data of the drill 1404 via an interface at the computer 1410.

The server 1406 represents one or more drill guidance devices connected to the computer 1410, the database 1408, and the mobile device 1412 via the network 1402. In some implementations, processing circuitry of the server 1406 receives instructions from the mobile device 1412 based on sensor data obtained by one or more sensors on the drill 1404 connected to the mobile device 1412. Note that each of the functions of the described implementations may be implemented by one or more processing circuits. A processing circuit includes a programmed processor (for example, processor 1600 of FIG. 16), as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure.

The database 1408 represents one or more databases connected to the computer 1410, the server 1406, and the mobile device 1412 via the network 1402. In some implementations, the drill guidance data is stored in the database 1408. For example, the drill guidance data from current, concurrent, or previous guidance implementations can be stored by the processing circuitry of the drill guidance device 1406 to provide data models that can be used to assist in the predictive method for drill guidance. In MWD implementations, the database 1408 can be used to gather the current data and to provide comparative data from previously stored data.

The mobile device 1412 represents one or more mobile devices connected to the computer 1410, the server 1406, and the database 1408 via the network 1402. The network 1402 represents one or more networks, such as the Internet, connecting the computer 1410, the drill 1404, the drill guidance device 1406, the database 1408, and the mobile device 1412. The network 1402 can also communicate via wireless networks such as WI-FI, BLUETOOTH, cellular networks including EDGE, 3G and 4G wireless cellular systems, or any other wireless form of communication that is known.

As would be understood by one of ordinary skill in the art, based on the teachings herein, the mobile device 1412 or any other external device could also be used in the same manner as the computer 1410 to monitor the slant angle and formation properties that the drill trajectory. In addition, the computer 1410 and mobile device 1412 can be referred to interchangeably throughout the disclosure. Details regarding the processes performed by drill guidance system 1400 are discussed further herein. In addition, one or more sensors can be connected to the mobile device 1412, such as a magnetometer or porosity sensor, resistivity sensors or conductivity sensors, and any other type of formation sensor. The formation sensors can be integral to the drill guidance device or can be connected to the drill guidance device via a wired or wireless connection. The sensors can be integral to the drill 1404 or can be connected to the drill via wired or wireless connection.

Figure 15:
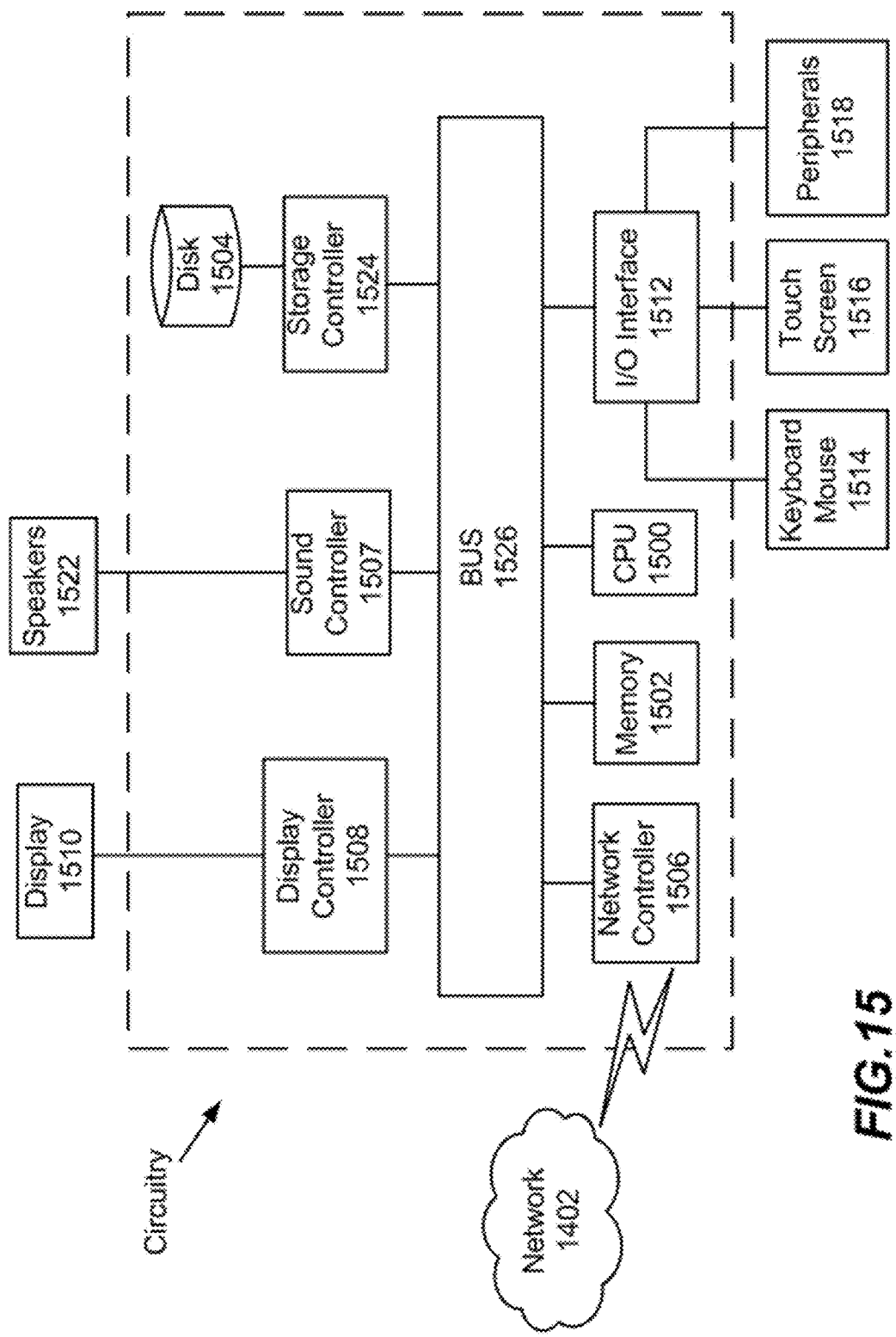
FIG. 15 is an exemplary diagram depicting the circuitry that can be in a drill guidance device.

FIG. 15 depicts an exemplary diagram of the circuitry employed in the drill guidance device and a hardware description of the circuitry according to exemplary implementations is described with reference to it. In FIG. 15, circuitry of the drill guidance device includes a CPU 1500 which performs the processes described above/below. The process data and instructions may be stored in memory 1502. These processes and instructions may also be stored on a storage medium disk 1504 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the circuitry of the drill guidance device communicates, such as a server or computer.

Further, the claimed advancements may be provided as a utility application, background daemon, or component of an operating system, or combination thereof, executing in conjunction with CPU 1500 and an operating system such as Microsoft Windows 7, UNIX, Solaris, LINUX, Apple MAC-OS and other systems known to those skilled in the art.

The hardware elements in order to achieve the circuitry of the drill guidance device may be realized by various circuitry elements, known to those skilled in the art. For example, CPU 1500 may be a Xenon or Core processor from Intel of America or an Opteron processor from AMD of America, or may be other processor types that would be recognized by one of ordinary skill in the art. Alternatively, the CPU 1500 may be implemented on an FPGA, ASIC, PLD or using discrete logic circuits, as one of ordinary skill in the art would recognize. Further, CPU 1500 may be implemented as multiple processors cooperatively working in parallel to perform the instructions of the inventive processes described above.

The circuitry of the drill guidance device in FIG. 15 also includes a network controller 1506, such as an Intel Ethernet PRO network interface card from Intel Corporation of America, for interfacing with network 1402. As can be appreciated, the network 1402 can be a public network, such as the Internet, or a private network such as an LAN or WAN network, or any combination thereof and can also include PSTN or ISDN sub-networks. The network 1402 can also be wired, such as an Ethernet network, or can be wireless such as a cellular network including EDGE, 3G and 4G wireless cellular systems. The wireless network can also be WiFi, Bluetooth, or any other wireless form of communication that is known.

The circuitry of the drill guidance device further includes a display controller 1508, such as a NVIDIA GeForce GTX or Quadro graphics adaptor from NVIDIA Corporation of America for interfacing with display 1510, such as a Hewlett Packard HPL2445w LCD monitor. A general purpose I/O interface 1512 interfaces with a keyboard and/or mouse 1514 as well as a touch screen panel 1516 on or separate from display 1510. General purpose I/O interface also connects to a variety of peripherals 1516 including printers and scanners, such as an OfficeJet or DeskJet from Hewlett Packard.

A sound controller 1507 is also provided in the circuitry of the drill guidance device, such as Sound Blaster X-Fi Titanium from Creative, to interface with speakers/microphone 1522 thereby providing sounds and/or music.

The general purpose storage controller 1524 connects the storage medium disk 1504 with communication bus 1526, which may be an ISA, EISA, VESA, PCI, or similar, for interconnecting all of the components of the circuitry of the drill guidance device. A description of the general features and functionality of the display 1510, keyboard and/or mouse 1514, as well as the display controller 1508, storage controller 1524, network controller 1506, sound controller 1507, and general purpose I/O interface 1512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 16.

Figure 16:
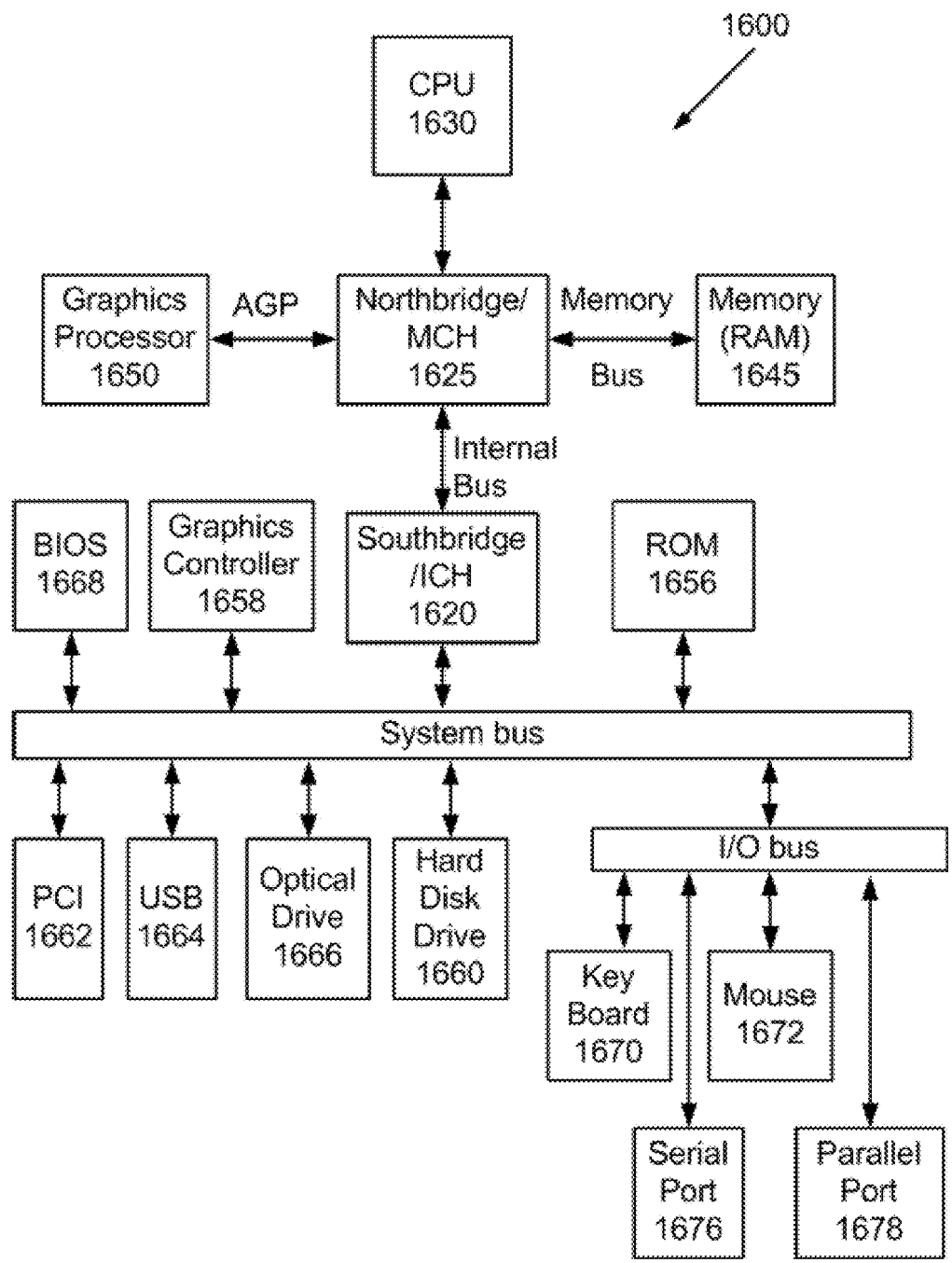
FIG. 16 is an exemplary diagram depicting a programmable processor that can be employed in the drill guidance device.

FIG. 16 shows a schematic diagram of a data processing system, according to certain implementations, for performing a method to control a trajectory of a drill. The data processing system is an example of a computer in which code or instructions implementing the processes of the illustrative implementations may be located.

In FIG. 16, data processing system 1600 employs a hub architecture including a north bridge and memory controller hub (NB/MCH) 1625 and a south bridge and input/output (I/O) controller hub (SB/ICH) 1620. The central processing unit (CPU) 1630 is connected to NB/MCH 1625. The NB/MCH 1625 also connects to the memory 1645 via a memory bus, and connects to the graphics processor 1650 via an accelerated graphics port (AGP). The NB/MCH 1625 also connects to the SB/ICH 1620 via an internal bus (e.g., a unified media interface or a direct media interface). The CPU Processing unit 1630 may contain one or more processors and even may be implemented using one or more heterogeneous processor systems.

Figure 17:
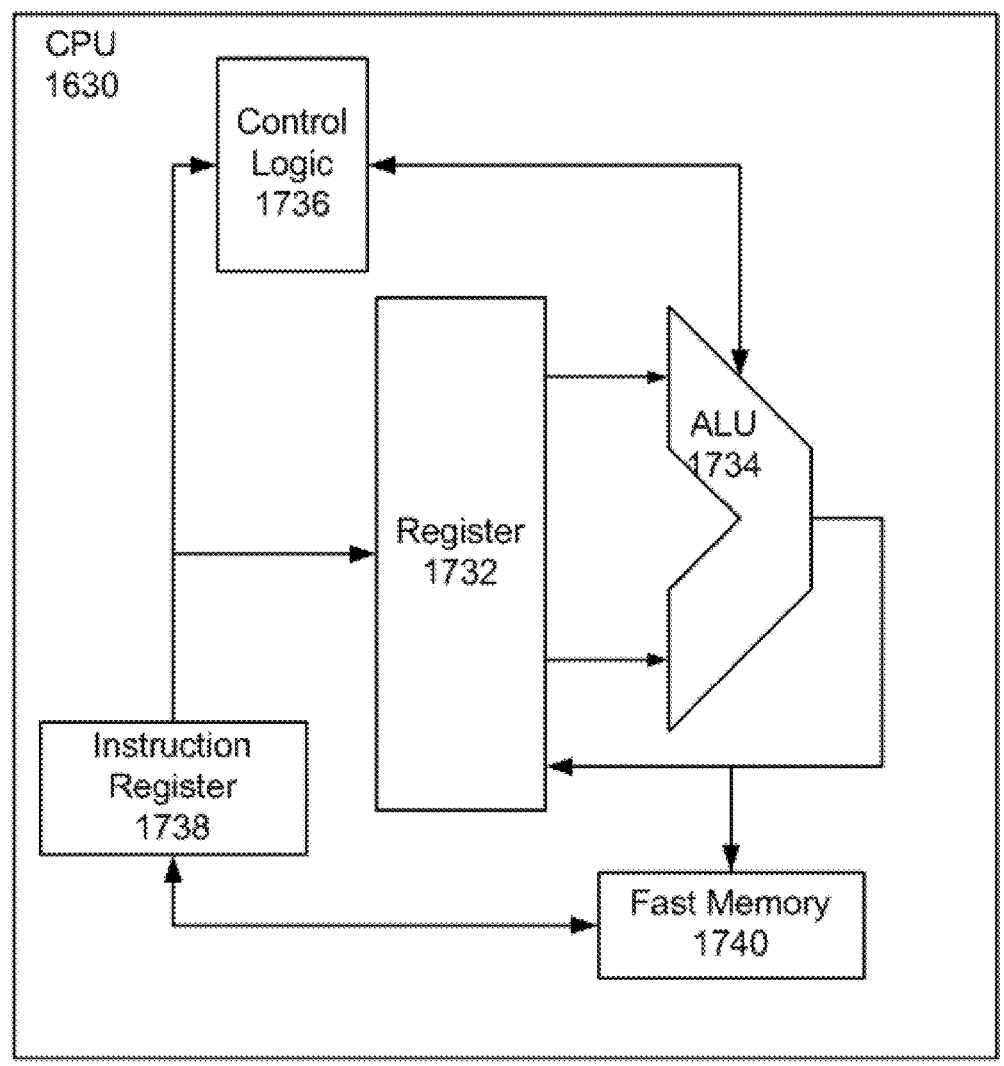
FIG. 17 is an exemplary diagram depicting the connectivity within a processor that can be employed in a drill guidance device.

For example, FIG. 17 shows one implementation of CPU 1630. In one implementation, the instruction register 1738 retrieves instructions from the fast memory 1740. At least part of these instructions are fetched from the instruction register 1738 by the control logic 1736 and interpreted according to the instruction set architecture of the CPU 1730. Part of the instructions can also be directed to the register 1732. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1734 that loads values from the register 1732 and performs logical and mathematical operations on the loaded values according to the instructions. The results from these operations can be feedback into the register and/or stored in the fast memory 1740. According to certain implementations, the instruction set architecture of the CPU 1630 can use a reduced instruction set architecture, a complex instruction set architecture, a vector processor architecture, a very large instruction word architecture. Furthermore, the CPU 1630 can be based on the Von Neuman model or the Harvard model. The CPU 1630 can be a digital signal processor, an FPGA, an ASIC, a PLA, a PLD, or a CPLD. Further, the CPU 1630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 16, the data processing system 1600 can include that the SB/ICH 1620 is coupled through a system bus to an I/O Bus, a read only memory (ROM) 1656, universal serial bus (USB) port 1664, a flash binary input/output system (BIOS) 1668, and a graphics controller 1658. PCI/PCIe devices can also be coupled to SB/ICH 1620 through a PCI bus 1662.

The PCI devices may include, for example, Ethernet adapters, add-in cards, and PC cards for notebook computers. The Hard disk drive 1660 and CD-ROM 1666 can use, for example, an integrated drive electronics (IDE) or serial advanced technology attachment (SATA) interface. In one implementation the I/O bus can include a super I/O (SIO) device.

Further, the hard disk drive (HDD) 1660 and optical drive 1666 can also be coupled to the SB/ICH 1620 through a system bus. In one implementation, a keyboard 1670, a mouse 1672, a parallel port 1678, and a serial port 1676 can be connected to the system bust through the I/O bus. Other peripherals and devices that can be connected to the SB/ICH 1620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The above-described hardware description is a non-limiting example of corresponding structure for performing the functionality described herein.

FIGS. 12-13A illustrate exemplary algorithmic flowchart for performing a method to control a trajectory of a drill according to one aspect of the present disclosure. The hardware description above, exemplified by any one of the structure examples shown in FIG. 14, 15, or 17, constitutes or includes specialized corresponding structure that is programmed or configured to perform the algorithm shown in FIGS. 12-13A. For example, the algorithm shown in FIG. 12 may be completely performed by the circuitry included in the single device shown in FIG. 14 or the chipset as shown in FIG. 15, or the algorithm may be completely performed in a shared manner distributed over the circuitry of any plurality of the devices shown in FIG. 17.

The method described herein and exemplified in FIGS. 12-13A can be implemented by a non-transitory computer readable medium.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A guided drill system, comprising:
a drill controller,
a drill,
one or more sensors, and
a drill guidance device, wherein the drill controller is electronically connected to the drill guidance device which is electronically connected to the drill, and wherein the sensors are located on the drill and electronically connected to the drill guidance device;
wherein the drill guidance device comprises:
circuitry configured to:
determine a slant angle of a drill based on directional sensor data received from one or more sensor devices,
determine one or more formation properties based on formation sensor data received from the one or more sensor devices,
determine at least one of the slant angle or the formation property to increment,
determine a first productivity index from the slant angle or the formation property,
determine a second productivity index from an incremented slant angle or an incremented formation property, and
calculate a corrected drill angle based on the slant angle and the formation properties corresponding to the greater of the first productivity index and the second productivity index, and
output the corrected drill angle to a drill controller configured to control an angle of trajectory of the drill,
wherein the first productivity index and the second productivity index (J) is defined by:

$$J = \frac{kh}{141.2\left[\ln\left(\frac{r_e}{r_w}\right)\right]} + 0.0025\left[h^{0.65}k^{0.52}\left(\tan\frac{\theta}{4}\right)^{1.22}\right]^{1.9267},$$

wherein $r_e$ is a drainage radius or an external boundary radius and $r_w$ is a wellbore radius, slant angle is $\theta$, formation permeability is k, and formation thickness is h.

2. The guided drill system, of claim 1, wherein the circuitry is further configured to determine the slant angle based on the directional sensor data received from the sensors, and wherein the sensors include at least one of an accelerometer and a magnetometer.

3. The guided drill system, of claim 1, wherein one of the formation properties is a formation permeability.

4. The guided drill system, of claim 3, wherein the formation permeability is based on the formation sensor data received from a porosity sensor located on the drill.

5. The guided drill system, of claim 1, wherein one of the formation properties is a formation thickness.

6. The guided drill system, of claim 5, wherein the formation thickness is based on the formation sensor data received from a resistivity sensor or a conductivity sensor located on the drill.

7. The guided drill system, of claim 1, wherein the circuitry is further configured to recursively calculate the second productivity index when the second productivity index is less than the first productivity index.

8. The guided drill system, of claim 1, wherein the circuitry is further configured to determine the corrected drill angle based on a productivity index predictively calculated by accessing historical data from memory.

9. The guided drill system, of claim 1, wherein the corrected drill angle is based on a continuously calculated productivity index in a measuring while drilling operation.

* * * * *